(12) United States Patent
Choi et al.

(10) Patent No.: US 11,004,336 B2
(45) Date of Patent: May 11, 2021

(54) ELECTRONIC DEVICE AND METHOD OF PROVIDING DRIVING GUIDE INFORMATION

(71) Applicant: SAMSUNG ELECTRONICS CO., LTD., Suwon-si (KR)

(72) Inventors: Jinyoung Choi, Suwon-si (KR); Yongjun Lim, Suwon-si (KR); Kyusung Kim, Suwon-si (KR); Dohyoung Kim, Suwon-si (KR); Soojung Bae, Suwon-si (KR); Juyeon You, Suwon-si (KR); Yeonee Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/668,310

(22) Filed: Oct. 30, 2019

(65) Prior Publication Data
US 2020/0160704 A1   May 21, 2020

(30) Foreign Application Priority Data
Nov. 16, 2018  (KR) .................. 10-2018-0141798

(51) Int. Cl.
*G08G 1/00*      (2006.01)
*G08G 1/0967*    (2006.01)
(Continued)

(52) U.S. Cl.
CPC ..... *G08G 1/096716* (2013.01); *G08G 1/0112* (2013.01); *G08G 1/0141* (2013.01); *G08G 1/096775* (2013.01); *H04W 4/40* (2018.02)

(58) Field of Classification Search
CPC ........... G08G 1/096716; G08G 1/0968; G08G 1/012; G08G 1/087
(Continued)

(56) References Cited

U.S. PATENT DOCUMENTS

| | | | |
|---|---|---|---|
| 6,243,026 B1 * | 6/2001 | Jones ...................... | G08G 1/07 340/906 |
| 8,154,422 B2 * | 4/2012 | Hsu ........................ | G08G 1/161 340/903 |

(Continued)

FOREIGN PATENT DOCUMENTS

| KR | 10-2016-0055482 |   | 5/2016 |
|---|---|---|---|
| KR | 20160055482 A | * | 5/2016 |

(Continued)

*Primary Examiner* — Qutbuddin Ghulamali
(74) *Attorney, Agent, or Firm* — Nixon & Vanderhye P.C.

(57) ABSTRACT

According to an embodiment, an electronic device comprises a communication module comprising communication circuitry, a processor, and a memory operatively connected with the communication module and the processor, wherein the memory stores instructions configured to, when executed, enable the processor to obtain driving-related information from each of a plurality of vehicles positioned within a designated distance from a roundabout using the communication module, determine driving expectation information about a time and direction in which each of the plurality of vehicles enters or exits the roundabout based on the obtained driving-related information, and transmit driving guide information produced based on the determined driving expectation information to each of the plurality of vehicles through the communication module.

18 Claims, 18 Drawing Sheets

(51) Int. Cl.
*G08G 1/01* (2006.01)
*H04W 4/40* (2018.01)

(58) Field of Classification Search
USPC .......................................... 340/905
See application file for complete search history.

(56) References Cited

U.S. PATENT DOCUMENTS

| 2012/0095646 | A1* | 4/2012 | Ghazarian | ............... | G01S 19/17 |
| | | | | | 701/36 |
| 2017/0256167 | A1* | 9/2017 | Kim | ........................ | G08G 1/166 |
| 2017/0301233 | A1* | 10/2017 | Witt | ........................ | G08G 1/087 |
| 2017/0301237 | A1* | 10/2017 | MacNeille | .......... | H04W 68/005 |
| 2019/0265061 | A1* | 8/2019 | Makita | ............... | G01C 21/3679 |

FOREIGN PATENT DOCUMENTS

| KR | 10-2017-0007925 | 1/2017 |
| KR | 10-2017-0056233 | 5/2017 |

\* cited by examiner

ELECTRONIC DEVICE AND METHOD OF PROVIDING DRIVING GUIDE INFORMATION

CROSS-REFERENCE TO RELATED APPLICATION

This application is based on and claims priority under 35 U.S.C. § 119 to Korean Patent Application No. 10-2018-0141798, filed on Nov. 16, 2018, in the Korean Intellectual Property Office, the disclosure of which is incorporated by reference herein in its entirety.

BACKGROUND

Field

The disclosure relates to electronic devices and methods of providing driving guide information to vehicles using a roundabout.

Description of Related Art

There is an increasing interest in vehicle-to-everything (V2X) for efficiently managing traffic while preventing driving vehicles from having traffic accidents. V2X refers to all types of communication schemes applicable to vehicles, which encompass vehicle-to-vehicle (V2V) communication, vehicle-to-infrastructure (V2I) communication, vehicle-to-network (V2N) communication, and vehicle-to-pedestrian (V2P) communication.

V2X has made a significant contribution to increasing driving safety and prevention of traffic accidents and is becoming a necessity. As combined with other technological sectors, V2X has more applications in providing various services, not alone as a driving assistant for the purpose of preventing collisions or increasing efficiency. For example, the combination of V2X and augmented reality three-dimensional heads-up display (AR 3D HUD) may deliver a rich entertainment experience to drivers.

With the use of V2X soaring, V2X is advancing from simply warning or indicating the likelihood of lane departure or collisions to analyzing beforehand traffic, which is hard to predict, and providing a driving guide per vehicle to thereby prevent possible accidents in an active manner. At intersections, accidents may be frequent due to low visibility and heavy traffic. V2X may analyze the speed and distance of vehicles simultaneously entering an intersection and provide driving guides for preventing accidents. At roundabouts with no traffic lights, unlike signaled intersections, entry and/exit of vehicles occur at different times and traffic is frequently varied, rendering it difficult to predict the context or position of collisions. It may be harder to precisely analyze traffic at a roundabout where V2X-capable vehicles and V2X-incapable vehicles are together.

The above information is presented as background information only to assist with an understanding of the disclosure. No determination has been made, and no assertion is made, as to whether any of the above might be applicable as prior art with regard to the disclosure.

SUMMARY

According to various example embodiments of the disclosure, there may be provided an electronic device and method of providing driving guide information per vehicle by gathering and analyzing information regarding the driving contexts of vehicles which are to enter, or have already entered, a roundabout.

In accordance with various example embodiments, an electronic device comprises a communication module comprising communication circuitry, a processor, and a memory operatively connected with the communication module and the processor, wherein the memory stores instructions configured to, when executed, enable the processor to obtain driving-related information from each of a plurality of vehicles positioned within a designated distance from a roundabout using the communication module, determine driving expectation information about a time and direction in which each of the plurality of vehicles enters or exits the roundabout based on the obtained driving-related information, and transmit driving guide information produced based on the determined driving expectation information through the communication module to each of the plurality of vehicles.

In accordance with various example embodiments, a method of providing driving guide information at a roundabout comprises obtaining driving-related information from each of a plurality of vehicles positioned within a designated distance from the roundabout, determining driving expectation information about a time and direction in which each of the plurality of vehicles enters or exits the roundabout based on the obtained driving-related information, and transmitting driving guide information produced based on the determined driving expectation information to each of the plurality of vehicles.

In accordance with various example embodiments, an electronic device comprises a communication module comprising communication circuitry, a display, a processor, and a memory operatively connected with the processor, wherein the memory stores instructions configured to, when executed, enable the processor to transmit driving-related information to a V2X service server using the communication module based on a vehicle having the electronic device installed therein being within a designated distance of a roundabout, and display driving guide information received from the V2X service server using the display.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
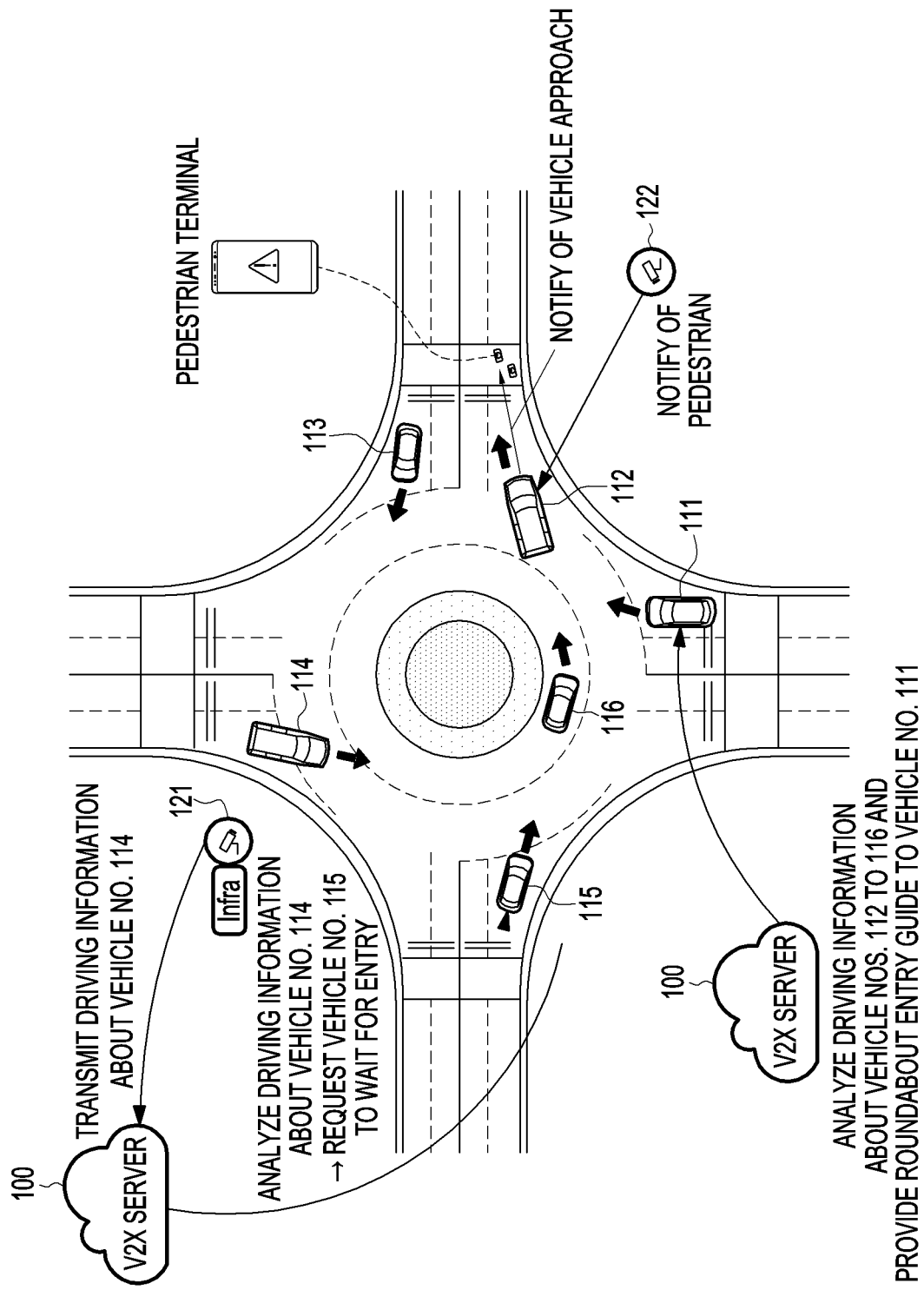
FIG. 1 is a diagram illustrating an example driving guide service provided at a roundabout according to an embodiment.

Hereinafter, various example embodiments of the disclosure are described with reference to the accompanying drawings. However, it should be appreciated that the disclosure is not limited to the example embodiments, and all changes and/or equivalents or replacements thereto also belong to the scope of the disclosure. The same or similar reference numerals may be used to refer to the same or similar elements throughout the disclosure and the drawings.

As used herein, the terms "have," "may have," "include," or "may include" a feature (e.g., a number, function, operation, or a component such as a part) indicate the existence of the feature and do not exclude the existence of other features.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially require "specifically designed in hardware to." Rather, the term "configured to" may refer, for example to a situation in which a device can perform an operation together with another device or parts. For example, the term "processor configured (or set) to perform A, B, and C" may refer, for example, and without limitation, to a generic-purpose processor (e.g., a CPU or application processor) that may perform the operations by executing one or more software programs stored in a memory device or a dedicated processor (e.g., an embedded processor), or the like, for performing the operations.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The terms as used herein are provided merely to describe various example embodiments thereof, and not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Examples of the electronic device may include, for example, and without limitation, at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, a wearable device (e.g., smart glasses, a head-mounted device (HMD), electronic clothes, an electronic bracelet, an electronic necklace, an electronic appcessory, an electronic tattoo, a smart mirror, or a smart watch), or the like.

According to an embodiment of the disclosure, the electronic device may be a smart home appliance. Examples of the smart home appliance may include, for example, and without limitation, at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, an electronic picture frame, or the like.

According to other embodiments, examples of the electronic device may include, for example, and without limitation, at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, internet of things (IoT) devices (e.g., a bulb, various sensors, an electric or gas meter, a sprinkler, a fire alarm, a thermostat, a street light, a toaster, fitness equipment, a hot water tank, a heater, or a boiler), or the like.

According to some embodiments, examples of the electronic device may include, for example, and without limitation, at least one of part of a piece of furniture or building/structure, an electronic board, an electronic signature receiving device, a projector, various measurement devices (e.g., devices for measuring water, electricity, gas, or electromagnetic waves), or the like. According to an embodiment of the disclosure, the electronic device may be one or a combination of the above-listed devices. According to an embodiment of the disclosure, the electronic device may be a flexible electronic device. The electronic device disclosed herein is not limited to the above-listed devices and may include new electronic devices depending on the development of technology.

FIG. 1 is a diagram illustrating an example driving guide service provided at a roundabout according to an embodiment.

A roundabout may refer, for example, to a type of circular intersection or junction in which road traffic is permitted to flow in one direction around a central island. At a roundabout, the time and direction of entry or exit of vehicles are not uniform, and multiple vehicles may change lanes simultaneously. Traffic accidents may be frequent at roundabouts because roundabouts lack traffic lights and many drivers are not used to roundabout driving rules. Traffic accidents at a roundabout may be reduced by gathering and analyzing traffic information about driving vehicles, determining the time of entry into the roundabout of a vehicle based on the analysis, and providing a driving guide service.

Referring to FIG. 1, a V2X server 100 may perform real-time analysis on the traffic at a roundabout where a plurality of vehicles 111, 112, 113, 114, 115, 116 (which may referred to hereinafter as vehicles 111 to 116) are driving or are to enter and provide a driving guide service per vehicle. For analysis of roundabout traffic, the V2X server 100 may gather driving-related information about the plurality of vehicles 111 to 116. The V2X server 100 may gather information including, for example, and without limitation, at least one of the destination, driving lane, driving direction, current position, current speed, steering angle, or the like, from V2X communication-capable vehicles 111, 112, 113, 115, and 116 among the plurality of vehicles. For a fourth vehicle 114 which is V2X communication-incapable among the plurality of vehicles, the V2X server 100 may gather information including, for example, and without limitation, at least one of the current position, current speed, steering angle, whether the turn signal indicator is on, a record regarding the driving habit of the fourth vehicle 114, or the like, from road infrastructure 121 and 122 inside the roundabout. The road infrastructure 121 and 122 may correspond, for example, and without limitation, to at least one of a camera or road structure installed in a designated position in the roundabout.

According to an embodiment, the V2X server 100 may gather and analyze the driving-related information about the vehicles 111 to 116 in a designated range from the roundabout periodically or when a particular event occurs. By analyzing the driving-related information, the V2X server 100 may determine that a first vehicle 111 is to enter a south stop line of the roundabout and predict the traffic of the time that the first vehicle 111 arrives at the roundabout. For example, the V2X server 100 may determine that there are other vehicles 112 to 116 around the roundabout at the time that the first vehicle 111 arrives at the roundabout and determine driving expectation information regarding the time and direction (route) in which the other vehicles 112 to 116 drive through and leave the roundabout based on the driving-related information gathered for each of the other vehicles 112 to 116. As a result of the determination, the V2X server 100 may recognize that a fifth vehicle 115 enters the west stop line of the roundabout to turn clockwise at the time that the first vehicle 111 arrives at the roundabout and that the driving routes of the two vehicles may partially overlap each other, and the V2X server 100 may determine the priorities of driving of the two vehicles based on at least one of the priority of entry, driving route (distance) and time, or the per-interval expected occupancy time of each of the first vehicle 111 and the fifth vehicle 115. The V2X server 100 may also determine that there are preceding vehicles passing the south-bound road of the roundabout at the time that the first vehicle 111 enters the south stop line of the roundabout and determine the time when the first vehicle 111 secures a safety distance from a second vehicle 112 which is the rearmost one among the preceding vehicles, thereby calculating the expected wait time of entry of the first vehicle 111. The V2X server 100 may transmit a wait time to allow the first vehicle 111 to wait for entry until the first vehicle 111 secures the safety distance and, a designated time (e.g., less than 1 second) after the time of securing the safety distance, releases the wait signal and then transmits an entry signal. The wait signal and the entry signal may be displayed using a virtual traffic light user interface (UI) through a display device provided in the first vehicle 111. For the wait signal, the calculated expected wait time and a brief notification, along with a red light indication, may be displayed. For the entry signal, a driving lane guide and a brief notification may be displayed together with a green light indication.

According to an embodiment, the V2X server 100 may determine that the second vehicle 112 is to pass the south-bound road of the roundabout, drive east, and leave the roundabout. The V2X server 100 may recognize the presence of a pedestrian around the east-bound road of the roundabout based on the information received from the road infrastructure 122 and transfer the position of the pedestrian to the second vehicle 112 to instruct the second vehicle 111 to slow down. According to an embodiment, the V2X server 100 may transfer a vehicle approach warning to the pedestrian terminal, or the second vehicle 112 itself may transmit the vehicle approaching route to the pedestrian terminal through V2P communication.

According to an embodiment, the V2X server 100 may determine that the third vehicle 113 enters from the east stop line of the roundabout and leaves north. The V2X server 100 may determine that there are no vehicles with overlapping expected driving routes until the third vehicle 113 leaves the roundabout based on driving-related information about the other vehicles 111, 112, 114, 115, and 116 and transmit an entry signal to the third vehicle 113 according to the determination. Receiving the entry signal from the V2X server 100, the third vehicle 113 may display the entry signal through the display device in the vehicle. For the entry signal, a brief notification and a driving lane guide, along with a green light indication, may be displayed.

According to an embodiment, the V2X server 100 may determine that a fourth vehicle 114 which does not support V2X communication is entering from the north of the roundabout based on the information received from the road infrastructure 122. The V2X server 100 may identify that the fourth vehicle 114 is involved in frequent speeding and careless driving and transmit a wait signal or warning information to the fifth vehicle 115 which is expected in the driving route to partially overlap the fourth vehicle 114. The fifth vehicle 115 may display a driving guide including a wait signal or warning information through the display device in the vehicle.

According to an embodiment, the V2X server 100 may determine that a sixth vehicle 116 entering from the west of the roundabout is to leave north and may provide a driving guide corresponding to a result of the determination to the sixth vehicle 116. For example, upon detecting a sudden lane change of the third vehicle 113 which is driving near the north-bound road while the sixth vehicle 116 is driving north of the roundabout, the V2X server 100 may again perform the traffic analysis due to the change in the driving-related information about the third vehicle and transfer a driving guide including a collision warning or slow-down instruction to the sixth vehicle 116.

The driving guides provided to the vehicles which are driving at the roundabout or are to enter the roundabout may be displayed using the respective display devices of the vehicles. For example, the display device may include, for example, and without limitation, at least one display of a smartphone or tablet PC mounted in the vehicle, or a head-up display (HUD), center information display (CID), cluster, or window which may display information in the vehicle. According to an embodiment, the driving guide may be output in the form of a voice, sound, or alert sound through a speaker device equipped in the vehicle.

As shown in FIG. 1, the V2X server 100 may gather driving-related information about vehicles which are driving or are to enter the roundabout, analyze the traffic in advance, and provide a driving guide per vehicle, thereby preventing and/or reducing accidents and enabling smooth flow of traffic at the roundabout.

Figure 2:
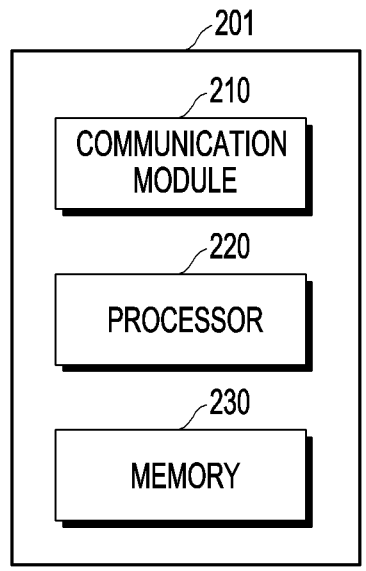
FIG. 2 is a block diagram illustrating an example electronic device providing driving guide information according to an embodiment.

FIG. 2 is a block diagram 200 illustrating an example electronic device 201 providing driving guide information according to an embodiment. An electronic device 201, as a device (e.g., the V2X server 100) that may analyze driving-related information about vehicles which are driving at or are to enter a roundabout, predict the traffic of the roundabout, and provide driving guide information per vehicle, may include a communication module (e.g., including communication circuitry) 210, a processor (e.g., including processing circuitry) 220, and/or a memory 230.

According to an embodiment, the communication module 210 may include various communication circuitry and communicate with vehicles driving around the roundabout or road infrastructure installed at the roundabout.

According to an embodiment, the processor 220 may include various processing circuitry and be operatively connected with the communication module 210, and the memory 230 may be operatively connected with the communication module 210 and the processor 220.

According to an embodiment, the memory 230 may store instructions configured to, when executed, enable the processor 220 to perform various operations. For example, the processor 220 may obtain driving-related information from each of a plurality of vehicles positioned within a designated distance from a roundabout using the communication module 210. The plurality of vehicles may be ones which are to enter the roundabout at arbitrary times or which have already entered the roundabout and are driving at the roundabout. The processor 220 (as used herein when functions are recited as being performed by the processor, it may be understood that the processor controls the electronic device to perform the function, which covers the processor performing the function) may determine whether each of the plurality of vehicles supports a V2X service. When the vehicle is determined to be a V2X service-supporting vehicle with V2X communication functionality, the processor 220 may obtain the driving-related information including at least one of the destination, driving lane, driving direction, current position, current speed, or steering angle from the vehicle. When the vehicle is determined to be a V2X service-non-supporting vehicle with no V2X communication functionality, the processor 220 may obtain the driving-related information including at least one of the current position, current speed, steering angle, whether the turn signal indicator is on, or a record regarding the driving habits of the vehicle through the road infrastructure installed in a designated position of the roundabout. The driving-related information may be information indicating the current driving state of each vehicle. The driving-related information may be obtained periodically or when a particular event occurs while each vehicle is positioned within a predetermined range from the roundabout. The particular event may correspond to at least one of when there is a vehicle entering or exiting the roundabout, when at least one of the plurality of vehicles suddenly changes lanes, or when there is a vehicle which does not observe the driving guide.

The processor 220 may determine driving expectation information about a time and direction in which each of the plurality of vehicles enters or exits the roundabout based on the obtained driving-related information. The driving expectation information may be information for predicting the direction in which the vehicles driving at the roundabout or to enter the roundabout at a particular time enter, the driving route along which the vehicles pass, and the direction in which the vehicles exit the roundabout. The driving expectation information may be updated continuously corresponding to obtaining the driving-related information per vehicle. For example, the processor 220 may determine the driving expectation information about at least one second vehicle expected to enter the roundabout or having entered and to drive at the roundabout with respect to the time that a first vehicle among a plurality of vehicles positioned within a designated distance from the roundabout enters in a first direction and may determine the time that the first vehicle secures a safe distance from the at least one second vehicle according to the determination. The processor 220 may calculate an expected occupancy time per interval of the roundabout for each vehicle based on at least one of the driving-related information or the driving expectation information about the plurality of vehicles. The processor 220 may determine the time when the first vehicle secures a safe distance from the rearmost second vehicle among vehicles at least partially overlapping in the driving route, the first vehicle 111 using the calculated per-interval occupancy time, and may produce driving guide information about each of the plurality of vehicles using at least one of the determined time of securing a safe distance or the calculated per-interval expected occupancy time. During the course, the processor 220 may determine a per-interval driving priority based on at least one of a wait time, a driving direction, a used lane, a priority of entry, or the per-interval expected occupancy time calculated for each of the plurality of vehicles. For example, when the second vehicle is expected to enter in the direction of interval B at the time when the first vehicle enters in the direction of interval A of the roundabout, the processor 220 may analyze the per-interval expected occupancy time of each of the first vehicle and second vehicle and whether the driving routes of the first and second vehicles overlap, thereby determining driving priority between the first vehicle and the second vehicle. As another example, when the second vehicle enters the roundabout and drives in interval A earlier than the first vehicle which is to enter the roundabout in the direction of interval A, the second vehicle which is the preceding vehicle may obtain a higher driving priority than the first vehicle. When the first vehicle and the second vehicle use different lanes in interval A (e.g., when the first vehicle enters the outer lane while the second vehicle is driving on the inner lane), the respective driving routes of the first vehicle and the second vehicle do not overlap and, thus, the processor 220 may assign the same driving priority to the first vehicle and the second vehicle. As another example, when preceding vehicles steadily enter interval A while the first vehicle waits to enter in the direction of interval A of the roundabout, the processor 220 may temporarily set the driving priority of the first vehicle to be higher if the wait time of the first vehicle passes a designated time, thereby preventing the first vehicle from indefinitely waiting and allowing the first vehicle to enter the roundabout.

The processor 220 may transmit the driving guide information produced for each of the plurality of vehicles based on the determined driving expectation information to each vehicle using the communication module 210. The driving guide information may be updated corresponding to a failure to observe the driving guide or lane change of at least one of the plurality of vehicles and be retransmitted. According to an embodiment, the processor 220 may produce pedestrian guide information based on the direction of exiting the roundabout which is determined for each of the plurality of vehicles and transmit the produced pedestrian guide to the pedestrian terminal positioned within a designated distance from the point where the vehicle exiting the roundabout is expected to leave.

According to an embodiment, an electronic device comprises a communication module, a processor, and a memory operatively connected with the communication module and the processor. The memory may store instructions which, when executed by the processor, control the electronic device to obtain driving-related information from each of a plurality of vehicles positioned within a designated distance from a roundabout using the communication module, determine driving expectation information about a time and direction in which each of the plurality of vehicles enters or exits the roundabout based on the obtained driving-related information, and transmit driving guide information produced based on the determined driving expectation information through the communication module to each of the plurality of vehicles.

According to an embodiment, the instructions when executed by the processor control the electronic device to to determine a time when a first vehicle entering the roundabout in a first direction among the plurality of vehicles secures a safe distance from at least one second vehicle having previously entered the roundabout and produce driving guide information including at least one of an expected wait time, lane guide, driving indication, or stop indication of each vehicle based on a result of the determination.

According to an embodiment, the instructions when executed by the processor control the electronic device to update and transmit the driving guide information when the at least one second vehicle changes lanes.

According to an embodiment, the instructions when executed by the processor control the electronic device to determine whether each of the plurality of vehicles supports a vehicle-to-everything (V2X) service and obtain the driving-related information including at least one of a destination, a driving lane, a driving direction, a current position, a current speed, or a steering angle when the vehicle supports the V2X service.

According to an embodiment, the instructions when executed by the processor control the electronic device to obtain the driving-related information including at least one of the current position, the current speed, the steering angle, whether a turn signal indicator is on, or a record about a driving habit when the vehicle does not support the V2X service.

According to an embodiment, the instructions when executed by the processor control the electronic device to calculate an expected occupancy time per interval of the roundabout for each of the plurality of vehicles based on at least one of the driving-related information or the driving expectation information and produce driving guide information for the plurality of vehicles using the calculated per-interval expected occupancy time.

According to an embodiment, the instructions when executed by the processor control the electronic device to determine a per-interval driving priority based on at least one of a wait time, a driving direction, a used lane, a priority of entry, or the per-interval expected occupancy time calculated for each of the plurality of vehicles and produce the driving guide information based on the determined driving priority.

According to an embodiment, the instructions when executed by the processor control the electronic device to obtain driving-related information corresponding to at least one condition of an occurrence of a vehicle entering or exiting the roundabout, a lane change of at least one of the plurality of vehicles, or a designated period and update the determination of the driving expectation information based on the driving-related information obtained corresponding to the at least one condition.

According to an embodiment, the instructions when executed by the processor control the electronic device to determine a direction of exiting the roundabout for the plurality of vehicles and transmit pedestrian guide information to a pedestrian terminal positioned within the designated distance from the roundabout based on the determination.

Figure 3:
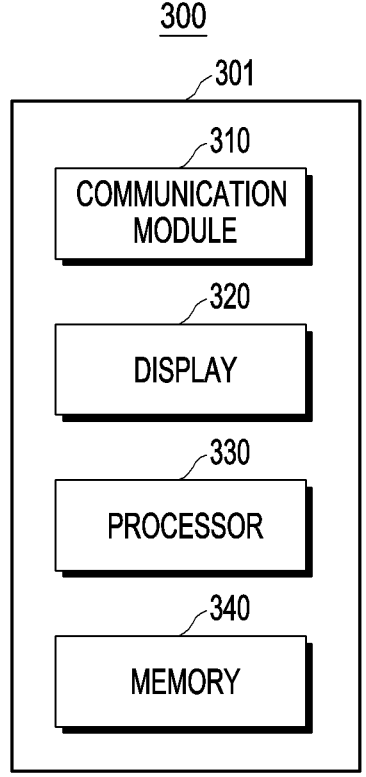
FIG. 3 is a block diagram illustrating an example electronic device displaying driving guide information according to an embodiment.

FIG. 3 is a block diagram 300 illustrating an example electronic device 301 displaying driving guide information according to an embodiment. An electronic device 301, as a device (e.g., a smartphone or tablet PC mounted in the vehicle, an HUD, a CID, a cluster, a window, a display device capable of displaying information, or the like) that receives driving guide information from a V2X server and displays the driving guide information when the vehicle has already entered the roundabout and is driving or the vehicle is about to enter the roundabout, may include a communication module (e.g., including communication circuitry) 310, a display 320, a processor (e.g., including processing circuitry) 330, and/or a memory 340.

According to an embodiment, the communication module 310 may include various communication circuitry and communicate with a V2X server, which analyzes the traffic of the roundabout to provide a driving guide, road infrastructure installed in the roundabout, or other vehicles driving around the roundabout.

According to an embodiment, the display 320 may display driving environment information about the electronic device 301 or driving guide information received from the V2X server.

According to an embodiment, the processor 330 may include various processing circuitry and be operatively connected with the communication module 310, and the memory 340 may be operatively connected with the communication module 310 and the processor 330.

According to an embodiment, the memory 340 may store instructions to, when executed, enable the processor 330 to perform various operations. For example, the processor 330 may transmit the driving-related information to the V2X server using the communication module 310, corresponding to the electronic device (301)-equipped vehicle entering within a designated distance from the roundabout. The driving-related information may include at least one of the destination, driving lane, driving direction, current position, current speed, or steering angle of the electronic device (301)-equipped vehicle. The processor 330 may transmit the driving-related information to the V2X server periodically or corresponding to occurrence of a particular event. The particular event may correspond to at least one of entry/exit of the electronic device (301)-equipped vehicle into/from the roundabout or a lane change of the vehicle.

The processor 330 may receive driving guide information from the V2X server using the communication module 310. The driving guide information may be information that the V2X server provides to lead each vehicle to a proper driving context based on the result of analyzing the traffic of the roundabout at a particular time using the driving-related information gathered from the vehicles positioned around the roundabout and may include at least one of the expected wait time for entry, lane guide, driving indication, or stop indication. The processor 330 may provide the driving guide information received from the V2X server to the user (e.g., the driver) using the display 320. For example, the processor 330 may display a virtual traffic light UI on the display 320 for providing more intuitive information and display the driving guide information using the virtual traffic light UI. When the driving guide information corresponds to the wait signal, an expected wait time and a brief notification, along with the stop indication (e.g., a red light indication), may be displayed. When the driving guide information corresponds to the entry signal, a driving lane guide and a brief notification, along with the driving indication (e.g., a green light indication), may be displayed. According to an embodiment, the processor 330 may be provided in the electronic device 301 or the vehicle to output the driving guide information using another output device (e.g., an audio module) interoperable with the electronic device 301.

According to an embodiment, an electronic device comprises a communication module comprising communication circuitry, a display, a processor, and a memory operatively connected with the processor. The memory may store instructions which when executed by the processor control the electronic device to, when a vehicle having the electronic device installed therein enters a designated distance from a roundabout, transmit driving-related information to a V2X service server using the communication module and display driving guide information received from the V2X service server using the display.

According to an embodiment, the instructions when executed by the processor control the electronic device to display a virtual traffic light on the display and display at least one of the expected wait time, lane guide, driving indication, or stop indication using the virtual traffic light.

Figure 4A:
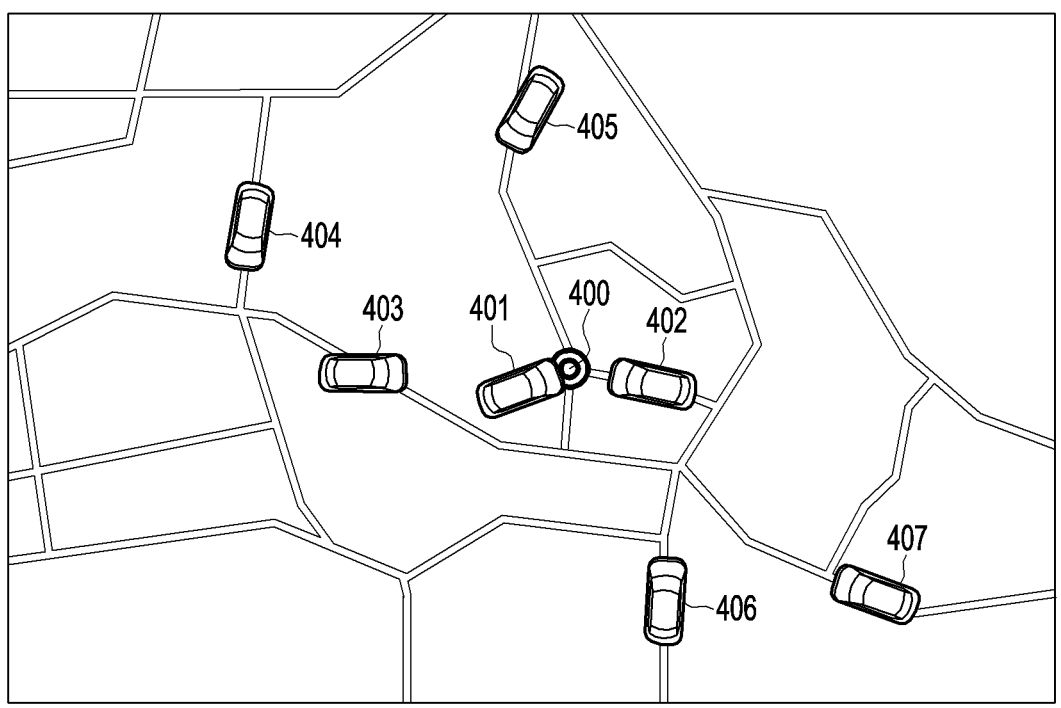
FIGS. 4A, 4B, and 4C are diagrams illustrating an example scheme of providing driving guide information for a vehicle which has already entered, or is about to enter, a roundabout according to an embodiment.
Figure 4B:
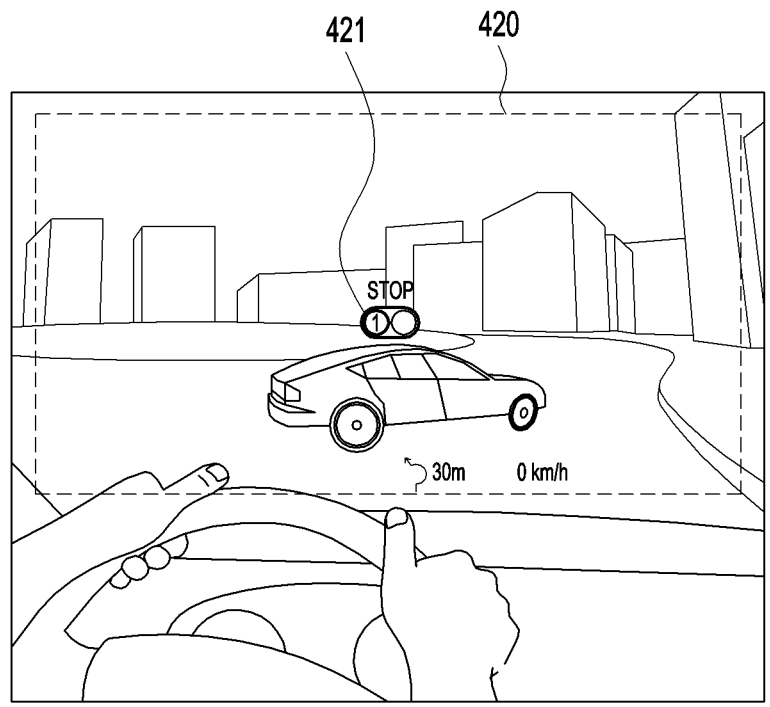
Figure 4C:
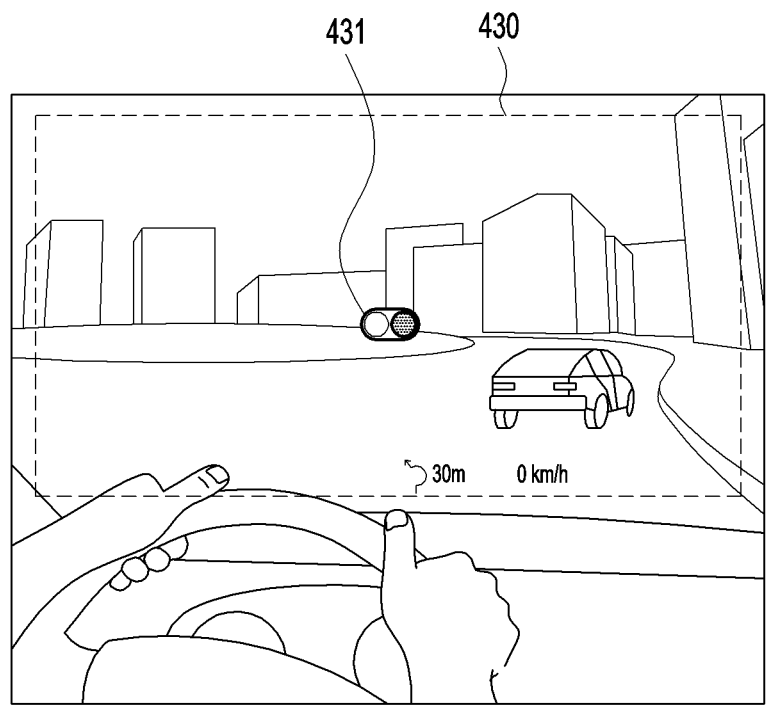

FIGS. 4A, 4B, and 4C are diagrams illustrating an example scheme of providing driving guide information for a vehicle which has already entered, or is to enter, a roundabout according to an embodiment.

Referring to FIG. 4A, the V2X server 100 may obtain driving-related information about each vehicle 401, 402, 403, 404, 405, 406, 407 (which may be referred to hereinafter as vehicles 401 to 407) which are within a designated range from the roundabout 400 periodically or corresponding to an occurrence of a particular event. The V2X server 100 may gather the driving-related information from each vehicle 401 to 407 or from road infrastructure (e.g., a camera or road structure) installed in a designated position of the roundabout 400. For example, a vehicle with the V2X communication functionality may transmit the driving-related information including at least one of a destination, a driving lane, a driving direction, a current position, a current speed, or a steering angle to the V2X server 100. A vehicle with no V2X communication functionality cannot communicate with the V2X server and, thus, this vehicle may transmit driving-related information including at least one of the current position, current speed or steering angle of the vehicle, whether the turn signal indicator is on or a record regarding the driving habits for the vehicle to the V2X server 100 using the road infrastructure of the roundabout 400.

According to an embodiment, the V2X server 100 may determine the vehicle driving at the roundabout 400 or to enter the roundabout 400 at a particular time based on the driving-related information obtained from the vehicles around the roundabout 400. For example, the V2X server 100 may determine that the first vehicle 401 and the second vehicle 402 entering the roundabout 400 will drive at the roundabout in a predetermined time and that the third vehicle 403, the fourth vehicle 404, the fifth vehicle 405, the sixth vehicle 406, or the seventh vehicle driving towards the roundabout 400 will enter the roundabout 400 in a predetermined time. For smooth flow of the vehicles driving at the roundabout 400, the V2X server 100 may determine the priority of each vehicle based on at least one of the priority of entry of each vehicle, expected occupancy time per interval of the roundabout 400, lane used, driving direction, or wait time and may produce driving guide information which is provided to each vehicle based on the determination.

The driving guide information transmitted from the V2X server 100 to each vehicle may be provided to the driver through the display device provided in each vehicle and may be displayed in the form as shown in FIGS. 4B and 4C. Referring to FIGS. 4B and 4C, the display device may include at least one display among an HUD, CID, cluster, or window which may display information in the vehicle. When the driving guide information corresponds to the wait signal, the display device 420 of the vehicle may display the stop indication (e.g., a red light indication 421), expected wait time, or a brief notification, e.g., 'stop' as shown in FIG. 4B. When the driving guide information corresponds to the entry signal, the display device 430 of the vehicle may display the driving indication (e.g., a green light indication 431), driving lane guide, and a brief notification as shown in FIG. 4C. According to an embodiment, the vehicle may output a guide voice or alert sound corresponding to the driving guide information using other output device (e.g., a speaker).

Figure 5:
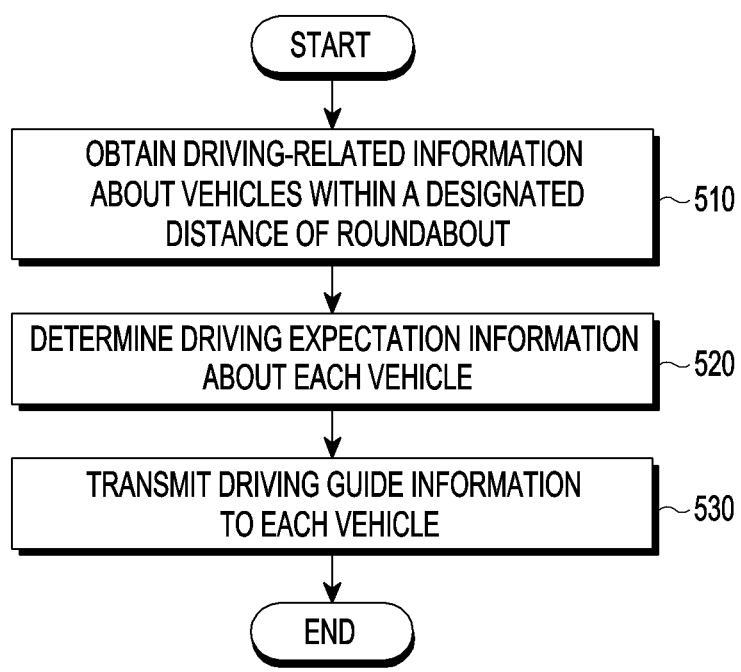
FIG. 5 is a flowchart illustrating an example method of providing driving guide information according to an embodiment.

FIG. 5 is a flowchart illustrating an example method of providing driving guide information according to an embodiment. According to an embodiment, the electronic device 201 may analyze driving-related information about vehicles which are to enter the roundabout 400 or have already entered and drive at the roundabout 400, determine the traffic of the roundabout, and provide per-vehicle driving guide information.

Referring to FIG. 5, in operation 510, the electronic device 201 may obtain driving-related information from each of a plurality of vehicles positioned within a designated distance from a roundabout. The plurality of vehicles may be ones which are to enter the roundabout within a predetermined time or which have already entered the roundabout and are driving at the roundabout. The electronic device 201 may determine whether each of the plurality of vehicles supports a V2X service. When the vehicle is determined to be a V2X service-supporting vehicle with V2X communication functionality, the electronic device 201 may obtain the driving-related information including at least one of the destination, driving lane, driving direction, current position, current speed, or steering angle from the vehicle. When the vehicle is determined to be a V2X service-non-supporting vehicle with no V2X communication functionality, the electronic device 201 may obtain the driving-related information including at least one of the current position, current speed, steering angle, whether the turn signal indicator is on or off, or the record regarding the driving habits of the vehicle through the road infrastructure installed in a designated position of the roundabout. In operation 510, the electronic device 201 may obtain the driving-related information corresponding to an occurrence of a particular event or at a designated period while each vehicle is positioned within a predetermined range from the roundabout. The particular event may correspond to at least one of when there is a vehicle entering or exiting the roundabout, when at least one of the plurality of vehicles suddenly changes lanes, or when there is a vehicle which does not observe the driving guide.

In operation 520, the electronic device 201 may determine driving expectation information about a time and direction in which each of the plurality of vehicles enters or exits the roundabout based on the obtained driving-related information. Operation 520 may be performed corresponding to obtaining the driving-related information periodically or when a particular event occurs in operation 510 and continuous update may be carried out. In operation 520, the electronic device 201 may determine the driving expectation information about at least one second vehicle expected to enter first the roundabout and then drive at the roundabout with respect to the time that a first vehicle among a plurality of vehicles positioned within a designated distance from the roundabout enters in a first direction and may determine the time that the first vehicle secures a safe distance from the at least one second vehicle according to the determination. According to an embodiment, the electronic device 201 may calculate the expected occupancy time per interval of the roundabout for each vehicle based on at least one of the driving expectation information or driving-related information for the plurality of vehicles and determine the time when the safety distance between the first vehicle and the at least one second vehicle is secured using the calculated per-interval expected occupancy time. For example, the second vehicle may be the rearmost vehicle among the vehicles at least partially overlapping in the driving route of the first vehicle. The electronic device 201 may produce driving guide information for each of the plurality of vehicles using at least one of the determined time of securing the safety distance or the calculated per-interval expected occupancy time. During the course, the electronic device 201 may determine a per-interval driving priority based on at least one of a wait time, a driving direction, a used lane, a priority of entry, or the per-interval expected occupancy time calculated for each of the plurality of vehicles.

In operation 530, the electronic device 201 may transmit the driving guide information produced for each of the plurality of vehicles based on the determined driving expectation information to each vehicle. The driving guide information may be updated corresponding to a failure to observe the driving guide or lane change of at least one of the plurality of vehicles and be retransmitted. According to an embodiment, the electronic device 201 may produce pedestrian guide information based on the direction of exiting the roundabout which is determined for each of the plurality of vehicles and transmit the produced pedestrian guide to the pedestrian terminal positioned within a designated distance from the point where the vehicle exiting the roundabout is expected to leave.

According to an embodiment, a method of providing driving guide information at a roundabout comprises obtaining driving-related information from each of a plurality of vehicles positioned within a designated distance from the roundabout, determining driving expectation information about a time and direction in which each of the plurality of vehicles enters or exits the roundabout based on the obtained driving-related information, and transmitting driving guide information produced based on the determined driving expectation information to each of the plurality of vehicles.

According to an embodiment, determining the driving expectation information may include determining a time when a first vehicle entering the roundabout in a first direction among the plurality of vehicles secures a safety distance from at least one second vehicle having previously entered the roundabout and producing the driving guide information including at least one of an expected wait time, lane guide, driving indication, or stop indication of each vehicle based on a result of the determination.

According to an embodiment, determining the driving expectation information may include updating the driving guide information when the at least one second vehicle changes lanes.

According to an embodiment, obtaining the driving-related information may include determining whether each of the plurality of vehicles supports a vehicle-to-everything (V2X) service and obtaining the driving-related information including at least one of a destination, a driving lane, a driving direction, a current position, a current speed, or a steering angle when the vehicle supports the V2X service.

According to an embodiment, obtaining the driving-related information may include obtaining the driving-related information including at least one of the current position, the current speed, the steering angle, whether a turn signal indicator is on, or a record about a driving habit when the vehicle does not support a V2X service.

According to an embodiment, transmitting the driving guide information may include calculating an expected occupancy time per interval of the roundabout for each of the plurality of vehicles based on at least one of the driving-related information or the driving expectation information and producing the driving guide information for the plurality of vehicles using the calculated per-interval expected occupancy time.

According to an embodiment, transmitting the driving guide information may include determining a per-interval driving priority based on at least one of a wait time, a driving direction, a used lane, a priority of entry, or the per-interval expected occupancy time calculated for each of the plurality of vehicles and producing the driving guide information based on the determined driving priority.

According to an embodiment, the driving-related information may be obtained corresponding to at least one condition of an occurrence of a vehicle entering or exiting the roundabout, a lane change of at least one of the plurality of vehicles, or a designated period. The driving expectation information may be updated based on the driving-related information obtained corresponding to the at least one condition.

According to an embodiment, the method may further include determining a direction of exiting the roundabout for the plurality of vehicles and transmitting pedestrian guide information to a pedestrian terminal positioned within the designated distance from the roundabout based on the determination.

Figure 6:
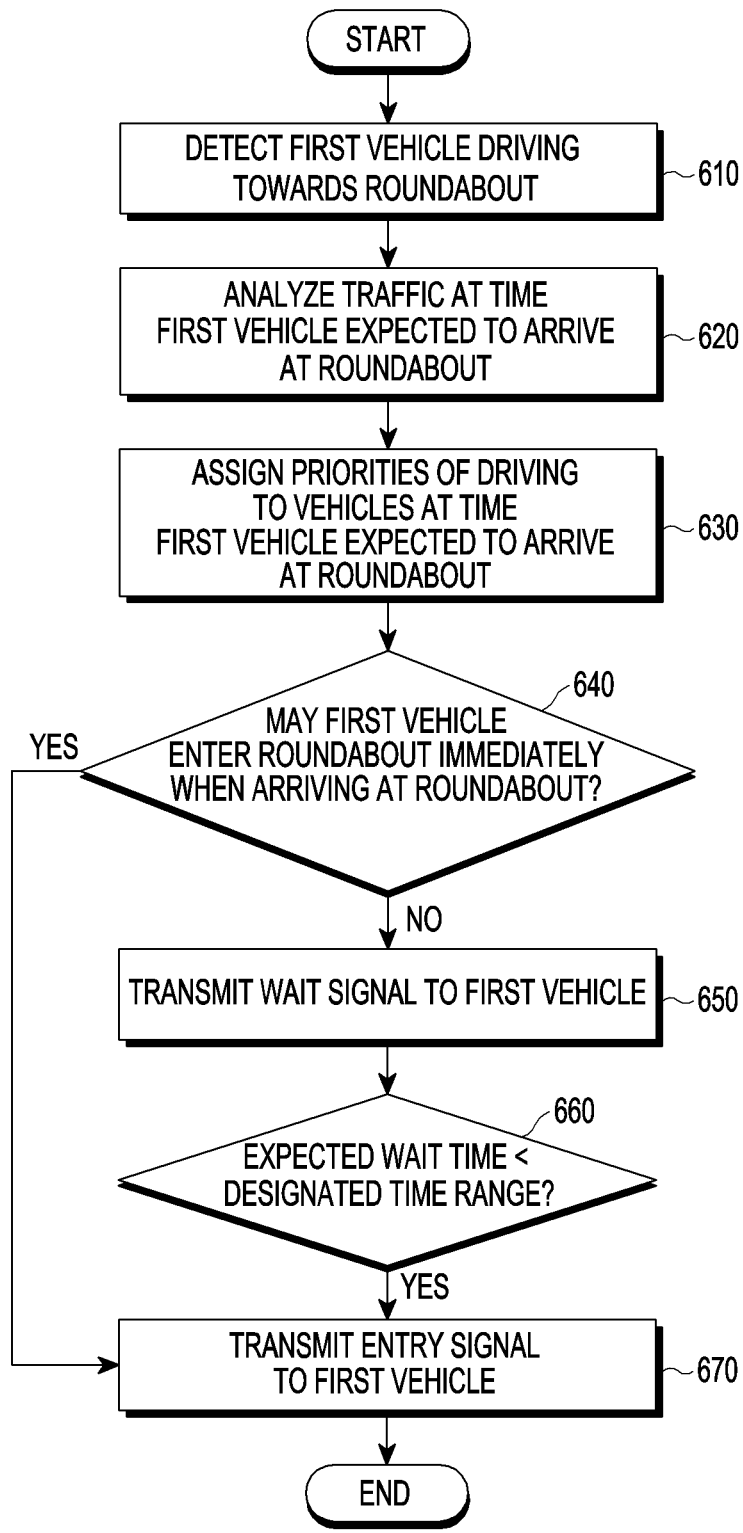
FIG. 6 is a flowchart illustrating an example process of analyzing a road context at a roundabout according to an embodiment.

FIG. 6 is a flowchart illustrating an example process of analyzing a road context at a roundabout according to an embodiment.

In operation 610, the V2X server 100 may detect the first vehicle driving towards a first area of the roundabout based on the driving-related information gathered for the vehicles positioned in a designated range from the roundabout. The V2X server 100 may obtain the driving-related information according to a designated period or when corresponding to at least one condition of when there is a vehicle entering or exiting the roundabout, when at least one of the plurality of vehicles suddenly changes lanes, or when there is a vehicle which does not observe the driving guide. The V2X server 100 may receive the driving-related information from the vehicles positioned within the designated range of the roundabout or via the road infrastructure installed in the roundabout. The road infrastructure may correspond to at least one of a camera or road structure installed in a designated position in the roundabout.

In operation 620, the V2X server 100 may analyze the traffic of the roundabout at the time when the first vehicle is expected to arrive at the first area of the roundabout. For example, the V2X server 100 may determine whether there is another vehicle to enter the roundabout or having already entered and driving at the roundabout at the time when the first vehicle arrives at the roundabout and determine the driving expectation information regarding the time and direction (route) in which the other vehicle drives and exits the roundabout based on the driving-related information about the other vehicle.

In operation 630, the V2X server 100 may assign the priorities of driving to the vehicles using the roundabout at the expected time of the first vehicle arriving at the roundabout based on the determined per-vehicle driving expectation information. For example, when the second vehicle is expected to enter the second area stop line at the time when the first vehicle enters the first area stop line of the roundabout, the V2X server 100 may analyze the per-interval expected occupancy time of each of the first vehicle and second vehicle and whether the driving routes of the first and second vehicles overlap, thereby determining driving priority between the first vehicle and the second vehicle. As another example, when the second vehicle passes the first area and drives towards the second area at the time when the first vehicle enters the first area of the roundabout, the V2X server 100 may give a higher driving priority to the second vehicle, which is the preceding vehicle, than the first vehicle. Although there is another vehicle using the roundabout at the time when the first vehicle enters the first area of the roundabout, if the driving route of the other vehicle does not overlap that of the first vehicle, the V2X server 100 may allocate the same driving priority to the first vehicle and the other vehicle. As another example, in a case where preceding vehicles continuously enter the interval including the first area while the first vehicle is waiting for entry at the first area of the roundabout, if the wait time of the first vehicle passes a designated time, the V2X server 100 may set the driving priority of the first vehicle to be temporarily higher, thereby preventing the first vehicle from indefinitely waiting.

In operation 640, the V2X server 100 may determine whether the first vehicle may enter the roundabout immediately when arriving at the roundabout based on the per-vehicle driving priority determined in operation 630. Upon determining that the first vehicle may not immediately enter the roundabout, the V2X server 100 may transmit a wait signal to the first vehicle in operation 650. The wait signal may be configured to allow the first vehicle to display the expected wait time and a brief notification along with the stop indication (e.g., a red light indication). The V2X server 100 may produce and transmit optimized driving guide information also for other vehicles using the roundabout according to the determined per-vehicle driving priority.

In operation 660, the V2X server 100 may determine whether the expected wait time of the first vehicle arrives within a designated time range (e.g., less than 1 second after the expected wait time expires). Operation 660 may periodically be performed until the expected wait time reaches the designated time range. Upon determining that the expected wait time of the first vehicle arrives at the designated time range, the V2X server 100 may transmit an entry signal to the first vehicle in operation 670. The entry signal may be configured to allow the first vehicle to display the driving lane guide and a brief notification along with the driving indication (e.g., a green light indication).

Upon determining that the first vehicle may immediately enter the roundabout in operation 640, the V2X server 100 may skip operations 650 and 660 and immediately perform operation 670 to transmit an entry signal to the first vehicle.

Figure 7:
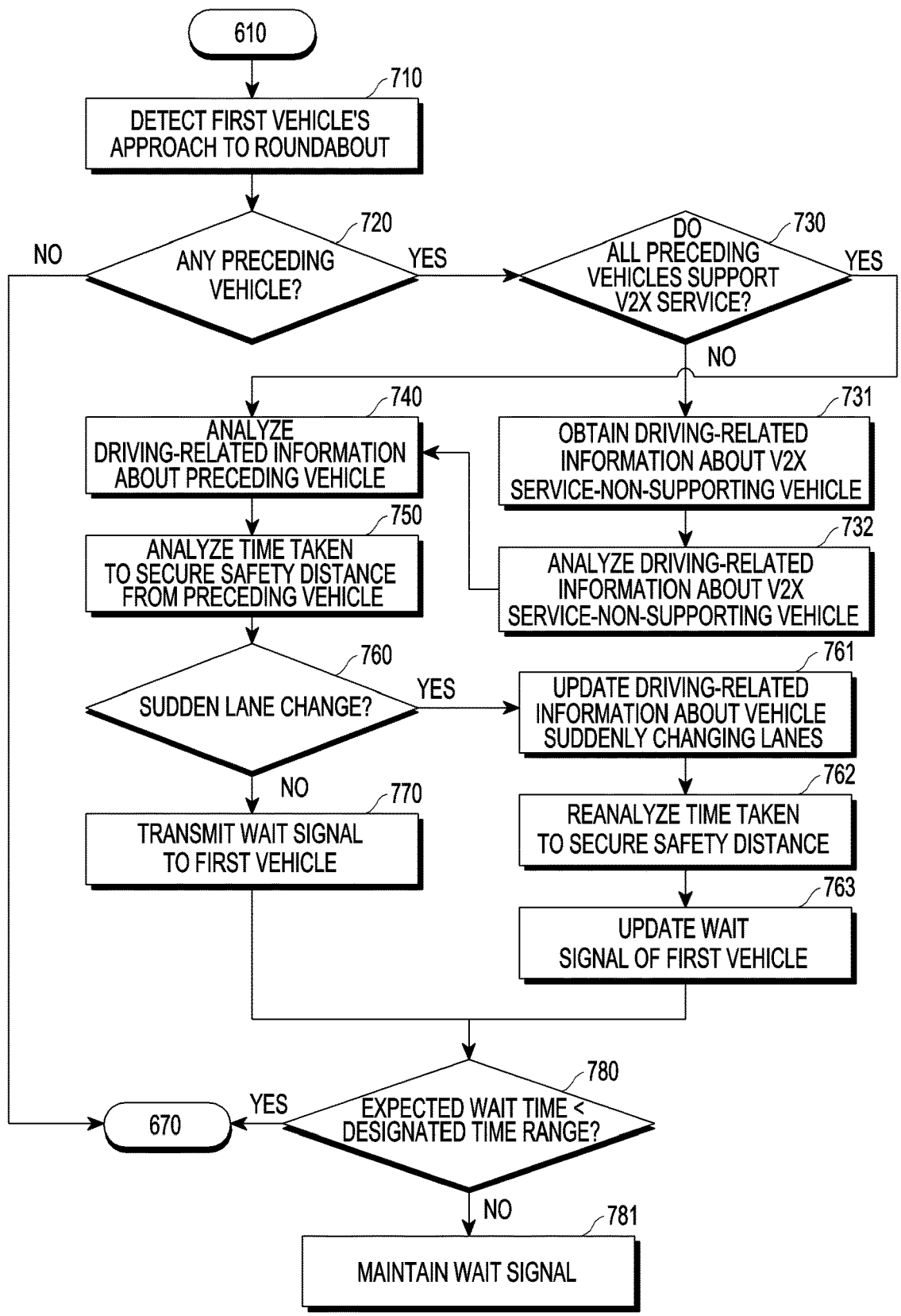
FIG. 7 is a flowchart illustrating an example process of calculating an expected wait time of a vehicle entering a roundabout according to an embodiment.

FIG. 7 is a flowchart illustrating an example process of calculating an expected wait time of a vehicle entering a roundabout according to an embodiment which shows an example process (corresponding to, e.g., operations 620 to 670 of FIG. 6) in which the V2X server 100 analyzes the traffic of roundabout at a particular time and provides driving guide information to each vehicle.

In operation 710, the V2X server 100 may detect that the first vehicle approaches the first area stop line of the roundabout based on the driving-related information gathered for the vehicles positioned within a designated range from the roundabout. As the first vehicle is determined to enter the roundabout, the V2X server 100 may analyze the traffic of the roundabout with respect to the time expected for the first vehicle to arrive at the roundabout.

In operation 720, the V2X server 100 may determine whether there is a preceding vehicle using the roundabout at the time expected for the first vehicle to arrive at the roundabout. A preceding vehicle may refer, for example, to a vehicle that enters and drives at the roundabout earlier than the first vehicle. Upon determining that there is no preceding vehicle, the V2X server 100 may transmit driving guide information corresponding to an entry signal to the first vehicle. When it is determined that there are preceding vehicles, the V2X server 100 may additionally determine whether all of the preceding vehicles support a V2X service in operation 730. Whether the preceding vehicle supports the V2X service may be determined depending on whether each vehicle has the V2X communication functionality.

Upon determining, in operation 730, that the preceding vehicles of the roundabout include a V2X service-nonsupporting vehicle, the V2X server 100 may obtain driving-related information about the V2X service-non-supporting vehicle in operation 731. The driving-related information about the V2X service-non-supporting vehicle may be obtained through a road infrastructure (e.g., a camera or road structure) installed in the roundabout and may include at least one of the current position, current speed, steering angle, or a turn signal indicator being on or off of the V2X service-non-supporting vehicle. In operation 732, the V2X server 100 may analyze the driving-related information about the V2X service-non-supporting vehicle and the record regarding the driving habit identified for the V2X service-non-supporting vehicle and may predict the time and direction (driving route) of entry/exit of the V2X service-non-supporting vehicle into/from the roundabout based on the analysis.

In operation 740, the V2X server 100 may analyze driving-related information about V2X service-supporting vehicles. When all of the preceding vehicles of the roundabout are determined in operation 730 to be V2X service-supporting vehicles, the V2X server 100 may skip operations 731 and 732 while immediately performing operation 740. The V2X server 100 may analyze the expected occupancy time per interval in the roundabout for each vehicle and whether routes overlap based on at least one of the destination, time of entry into roundabout, driving lane, driving direction, current position, current speed, or steering angle of each preceding vehicle. During this course, the V2X server 100 may also determine the driving priority of each vehicle.

In operation 750, the V2X server 100 may analyze the time taken for the first vehicle to secure a safety distance from the preceding vehicles based on the expected occupancy time per interval in a roundabout and whether routes overlap for each vehicle according to the analysis. For example, the V2X server 100 may calculate the time taken to secure a safety distance from the rearmost preceding vehicle among the preceding vehicles which at least partially overlap in the driving route the first vehicle.

In operation 760, the V2X server 100 may determine whether there is a vehicle making a sudden lane change among the vehicles using the roundabout. When there is determined in operation 760 to be a vehicle making a sudden lane change, the V2X server 100 may update the driving-related information about the lane changing vehicle in operation 761 and may reanalyze the time taken for the first vehicle to secure a safety distance based on the updated driving-related information in operation 762. In operation 763, the V2X server 100 may update the wait signal of the first vehicle based on the reanalysis. For example, the V2X server 100 may determine that the per-interval expected occupancy time of other preceding vehicles will increase due to the sudden lane-changing vehicle. Thus, the V2X server 100 may determine that the time taken for the first vehicle to secure a safety distance from the rearmost one among the preceding vehicles increases, for example, from 3 seconds to 5 seconds and may thus update the wait signal for the first vehicle. As the wait signal for the first vehicle is updated, the V2X server 100 may transmit the expected wait time updated for the first vehicle in operation 770.

When it is determined in operation 760 that there is no vehicle making a sudden lane change, the V2X server 100 may skip the update corresponding to operations 761, 762 and 763 and perform operation 770 to transmit a wait signal to the first vehicle.

In operation 780, the V2X server 100 may determine whether the expected wait time of the first vehicle arrives within a designated time range (e.g., less than 1 second after the expected wait time expires). Upon determining that the expected wait time of the first vehicle arrives at the designated time range, the V2X server 100 may perform operation 670, thus transmitting an entry signal to the first vehicle. Upon determining, in operation 780, that the expected wait time of the first vehicle does not arrive at the designated time range, the V2X server 100 may maintain the wait signal for the first vehicle in operation 781 while counting the expected wait time of the first vehicle.

Figure 8A:
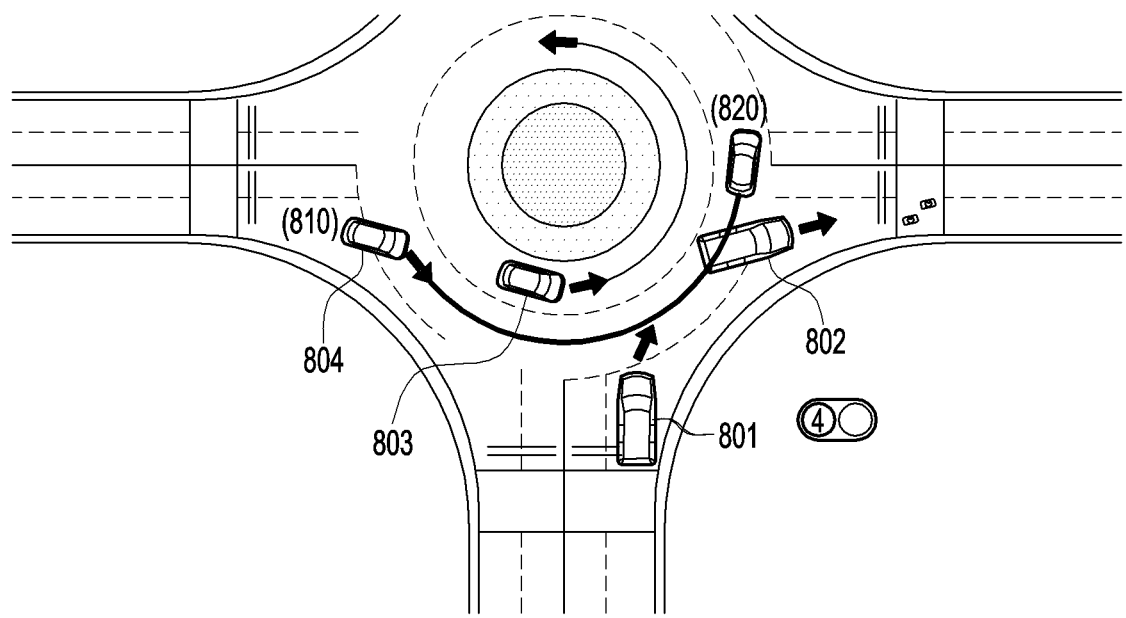
FIGS. 8A and 8B are diagrams illustrating an example scheme of calculating an expected wait time when all vehicles using a roundabout support a V2X service according to an embodiment.
Figure 8B:
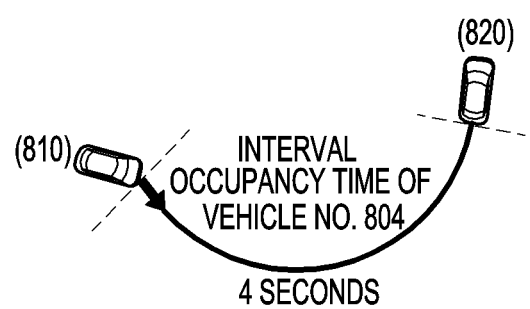

FIGS. 8A and 8B are diagrams illustrating an example scheme of calculating an expected wait time when all vehicles using a roundabout support a V2X service according to an embodiment.

Referring to FIG. 8A, the V2X server 100 may obtain driving-related information from each of the vehicles positioned within a designated distance from the roundabout, periodically or when a particular event occurs and determine that the first vehicle 801 is driving towards the south stop line of the roundabout based on the obtained driving-related information to predict traffic at the time when the first vehicle 801 arrives at the roundabout, the V2X server 100 may determine whether there is a preceding vehicle using the roundabout with respect to the time expected for the first vehicle 801 to arrive at the roundabout and, when any preceding vehicle, determine whether each vehicle supports the V2X service.

When all of the preceding vehicles are determined to support the V2X service, the V2X server 100 may analyze the expected occupancy time per interval in roundabout and whether routes overlap or not for each vehicle based on the latest driving-related information obtained from each preceding vehicle. The driving-related information may include at least one of the destination, time of entry into the roundabout, driving lane, driving direction, current position, current speed, or steering angle for each vehicle.

For example, the V2X server 100 may predict that the second vehicle 802, the third vehicle 803, and the fourth vehicle 804 will use the roundabout at the time when the first vehicle 801 arrives at the south stop line of the roundabout and determine that, among the preceding vehicles, the second vehicle 802 exiting the roundabout to the east and the third vehicle 803 driving on the inner lane of the roundabout do not overlap the first vehicle in driving route. The V2X server 100 may determine that, among the preceding vehicles, the fourth vehicle 804 may overlap the first vehicle 801 in driving route and time and may transmit a wait signal for instructing the first vehicle 801 to wait without entering the roundabout until a safety distance from the fourth vehicle 804 is secured, thereby preventing and/or reducing the likelihood of a collision between the first vehicle 801 and the fourth vehicle 804. Receiving the wait signal, the first vehicle 801 may display a stop indication (e.g., a red light indication) and expected wait time together using a display in the vehicle. The expected wait time of the first vehicle may be calculated using the time expected for the fourth vehicle to occupy the south-bound road interval of the roundabout, and the expected occupancy time of the fourth vehicle may be analyzed as shown in FIG. 8B.

In FIG. 8B, point 810 may correspond to the position of the fourth vehicle 804 at the time that the first vehicle 801 arrives at the roundabout, and point 820 may correspond to the position in which the first vehicle 801 may secure a minimum safety distance from the fourth vehicle 804. Since there are no other overlapping preceding vehicles in the corresponding interval while the fourth vehicle 804 drives from point 810 to point 820, the V2X server 100 may determine that the time, 4 seconds, taken for the fourth vehicle 804 to move from point 810 to point 820 is the expected occupancy time of the interval for the fourth vehicle.

Figure 9A:
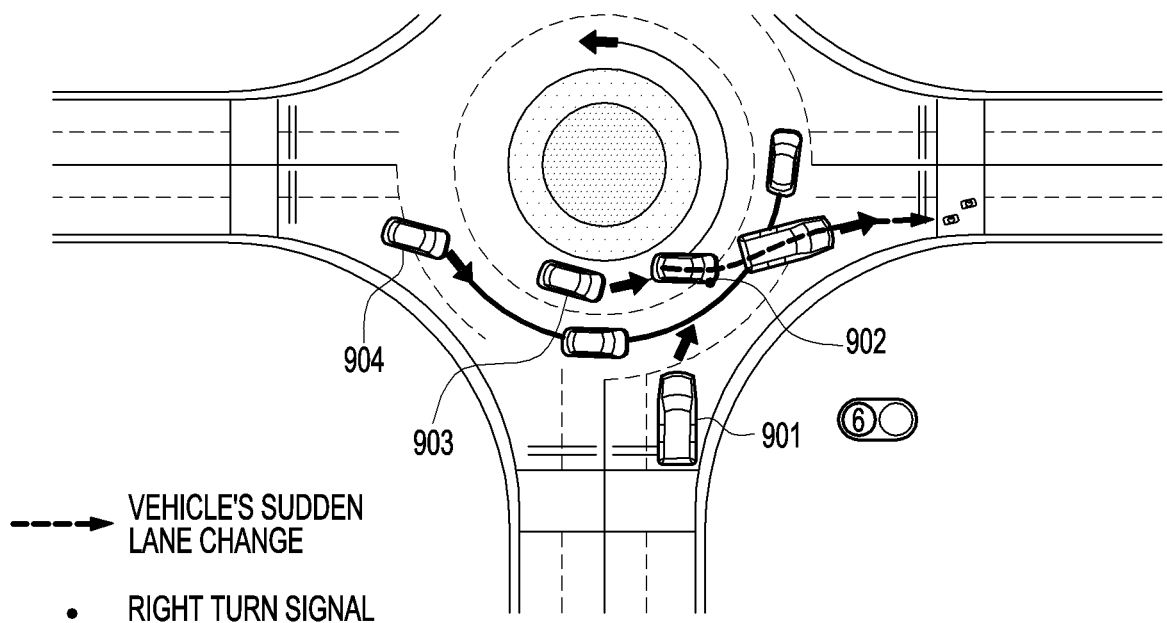
FIGS. 9A and 9B are diagrams illustrating an example scheme of calculating a predicted wait time when V2X service-supporting vehicles and V2X service-non-supporting vehicles are together at a roundabout according to an embodiment.
Figure 9B:
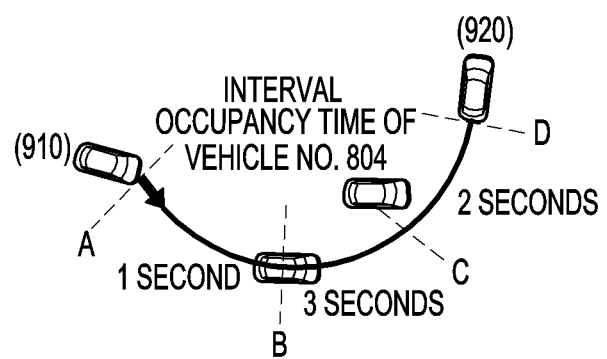

FIGS. 9A and 9B are diagrams illustrating an example scheme of calculating a predicted wait time when V2X service-supporting vehicles and V2X service-non-supporting vehicles are together at a roundabout according to an embodiment.

In FIG. 9A, to predict traffic at the time when the first vehicle 901 arrives at the roundabout, the V2X server 100 may determine whether there is a preceding vehicle using the roundabout with respect to the time expected for the first vehicle 901 to arrive at the roundabout and, when there is a preceding vehicle, determine whether each vehicle supports the V2X service.

Upon determining that a V2X service-non-supporting vehicle is among the preceding vehicles, the V2X server 100 may gather driving-related information about the V2X service-non-supporting vehicle using the road infrastructure installed in the roundabout. The driving-related information about the V2X service-non-supporting vehicle may include at least one of the current position, current speed, steering angle, whether the turn signal indicator is on, or record regarding driving habits for the vehicle. The V2X server 100 may analyze the expected occupancy time per interval in roundabout and whether routes overlap or not for each vehicle based on the latest driving-related information obtained from each V2X service-supporting vehicle and the driving-related information about the V2X service-non-supporting vehicle.

For example, the V2X server 100 may predict that the second vehicle 902, the third vehicle 903, and the fourth vehicle 904 will use the roundabout at the time when the first vehicle 901 arrives at the south area of the roundabout and determine that, among the preceding vehicles, the third vehicle 903 which is a V2X service-non-supporting vehicle, makes a sudden lane change. The V2X server 100 may determine that, among the preceding vehicles, the fourth vehicle 904 overlaps the first vehicle 901 in driving direction and time and that the fourth vehicle 904 may be influenced by the sudden lane change of the third vehicle 903 while driving and may reflect this in calculating the expected occupancy time. The expected occupancy time of the fourth vehicle 904 may be analyzed as shown in FIG. 9B.

In FIG. 9B, point 910 may correspond to the position of the fourth vehicle 904 at the time that the first vehicle 901 arrives at the roundabout, and point 920 may correspond to the position in which the first vehicle 901 may secure a minimum safety distance from the fourth vehicle 904. The V2X server 100 may set the interval where there are no other overlapping preceding vehicles while the fourth vehicle 904 drives from point 910 to point 920 to an A-B interval, the interval influenced by the sudden lane change of the third vehicle 903 to a B-C interval, and the interval influenced by the time taken for the second vehicle 902 to exit to a C-D interval. The V2X server 100 may predict that it takes one second to drive in the A-B interval based on the speed, direction, and distance of the fourth vehicle 904. The V2X server 100 may predict that a total of 3 seconds will be taken by reflecting 2 seconds which are additionally required due to the lane change of the third vehicle 903 in the B-C interval and that a total of 2 seconds will be taken by reflecting 1 second which is required for the second vehicle 902 to exit in the C-D interval. The V2X server 100 may sum up the predicted per-interval required times and determine that 6 seconds, which are required for the fourth vehicle 904 to move from point 910 to point 920, is the expected occupancy time for the corresponding interval of the fourth vehicle 904.

The V2X server 100 may transmit a wait signal to instruct the first vehicle 901 to wait without entering the roundabout until the first vehicle 901 secures a safety distance from the fourth vehicle 904, and the first vehicle 901 may receive the wait signal and display a stop indication (e.g., a red light indication) together with the expected wait time, e.g., six seconds, using the display in the vehicle.

Figure 10:
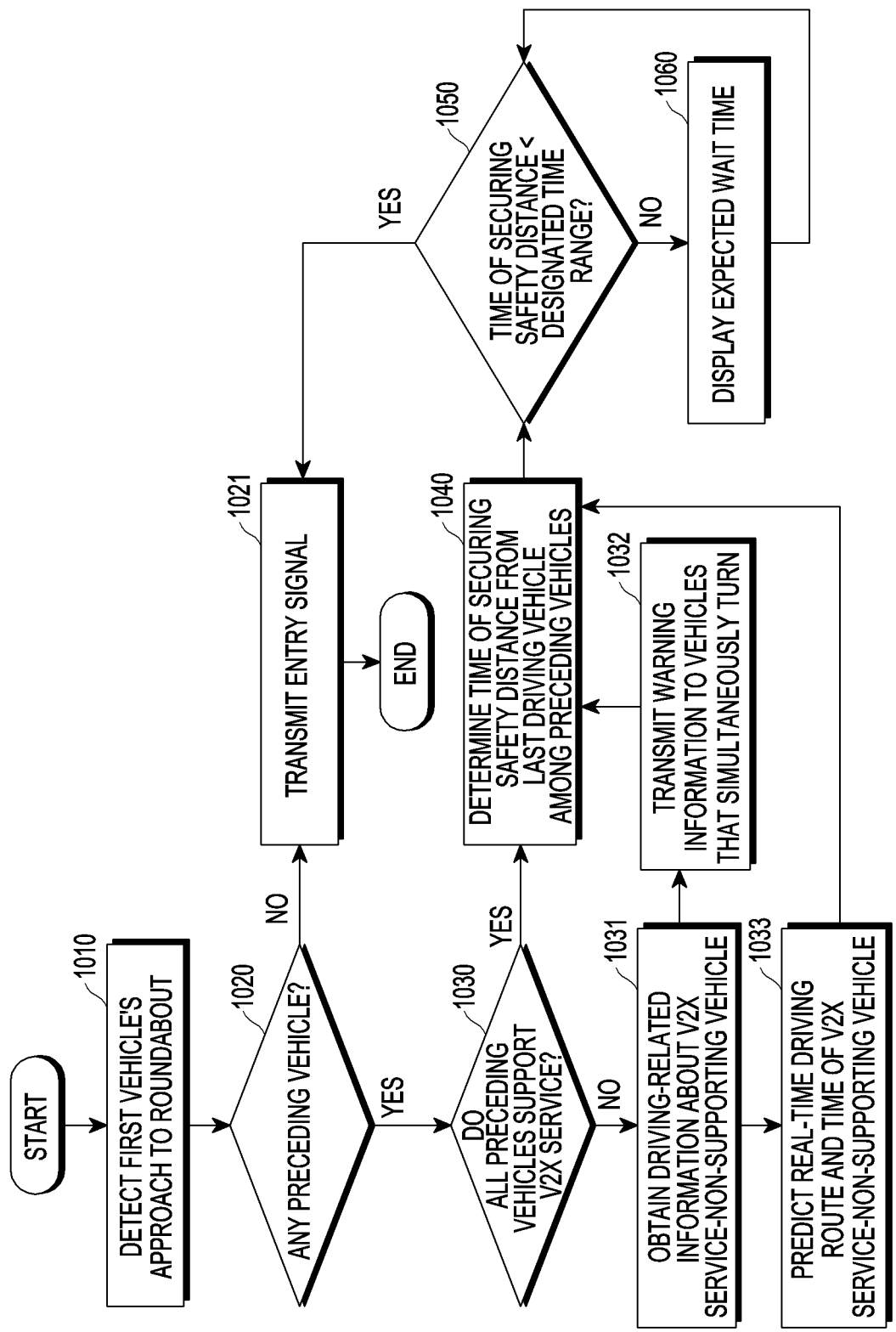
FIG. 10 is a flowchart illustrating an example method of providing driving guide information through analysis as to whether vehicles at a roundabout support a V2X service according to an embodiment.

FIG. 10 is a flowchart illustrating an example method of providing driving guide information through analysis as to whether vehicles at a roundabout support a V2X service according to an embodiment.

In operation 1010, the V2X server 100 may detect that the first vehicle approaches the first area of the roundabout based on the driving-related information gathered for the vehicles positioned within a designated range from the roundabout.

To analyze the traffic of the roundabout with respect to the time expected for the first vehicle to arrive at the roundabout, the V2X server 100 may determine whether there is a preceding vehicle using the roundabout at the time expected for the first vehicle to arrive at the roundabout in operation 1020. When there is determined in operation 1020 to be no preceding vehicle, the V2X server 100 may transmit an entry signal to the first vehicle in operation 1021.

When it is determined in operation 1020 that there are preceding vehicles, the V2X server 100 may additionally determine whether all of the preceding vehicles support a V2X service in operation 1030.

When it is determined in operation 1030 that there is a V2X service-non-supporting vehicle among the preceding vehicles of the roundabout, the V2X server 100 may obtain the driving-related information about the V2X service-non-supporting vehicle through the road infrastructure (e.g., a camera or road structure) installed in the roundabout in operation 1031 and transmit warning information to the vehicle turning or driving simultaneously with the V2X service-non-supporting vehicle in operation 1032. In operation 1033, the V2X server 100 may predict the real-time driving route and time of the roundabout of the V2X service-non-supporting vehicle by analyzing the driving-related information about the V2X service-non-supporting vehicle.

In operation 1040, the V2X server 100 may analyze the driving-related information about the preceding vehicles and determine the time when the first vehicle secures a safety distance from the last driving vehicle among the preceding vehicles. When all of the preceding vehicles of the roundabout are determined in operation 1030 to be V2X service-supporting vehicles, the V2X server 100 may skip operations 1031, 1032 and 1033 while immediately performing operation 1040.

In operation 1050, the V2X server 100 may determine whether the time of the first vehicle securing the safety distance arrives within a designated time range (e.g., less than one second). Upon determining in operation 1050 that the time of the first vehicle securing the safety distance is one second or more, the V2X server 100 may maintain the wait signal for the first vehicle while counting the expected wait time of the first vehicle in operation 1060. When the time of the first vehicle securing the safety distance is determined in operation 1050 to arrive within one second, the V2X server 100 may perform operation 1021, transmitting an entry signal to the first vehicle.

Figure 11:
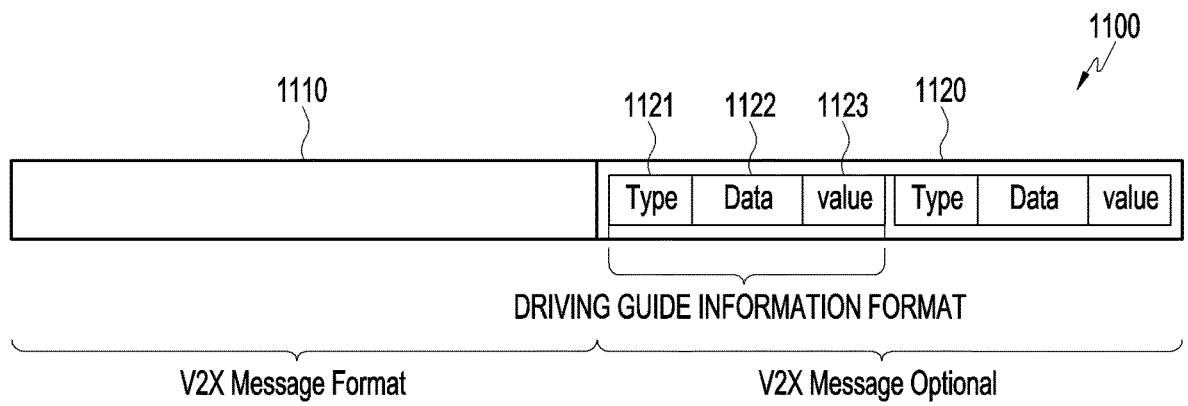
FIG. 11 is a diagram illustrating an example data format of driving guide information transmitted to each vehicle according to an embodiment.

FIG. 11 is a diagram illustrating an example data format of driving guide information transmitted to each vehicle according to an embodiment. Referring to FIG. 11, according to an embodiment, the driving guide information transmitted to each vehicle may be included and transmitted in a V2X message 1100.

For example, when the V2X message 1100 may include a V2X message format area 1110 and a V2X message additional area 1120, at least one piece of data constituting the driving guide information may be included and transmitted in the V2X message additional area 1120.

According to an embodiment, the data may include data fields, such as a type field 1121, a data field 1122, and a value field 1123. The type field 1121 may indicate the type of the driving guide information. According to an embodiment, the type field 1121 may include a reference value indicating at least one of the wait signal, entry signal, or warning signal for each vehicle.

The data field 1122 may include detailed information (e.g., an instruction text, traffic light indication, or expected wait time) included in the driving guide information. The value field 1123 may include a value to be displayed on each vehicle corresponding to the data field 1122. For example, when the type field 1121 includes a value indicating the wait signal, the data field 1122 may include a value indicating at least one of 'notification text,' 'traffic light indication,' or 'expected wait time,' and the value field 1123 may include a value indicating 'stop,' 'red light on,' or '5 seconds' corresponding to the data field 1122.

Figure 12A:
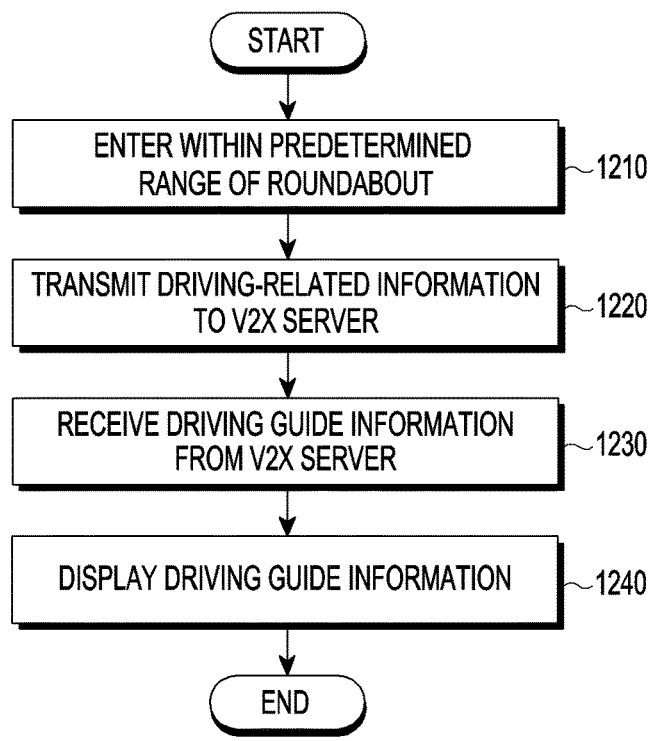
FIG. 12A is a flowchart illustrating an example method of displaying driving guide information according to an embodiment.
Figure 12B:
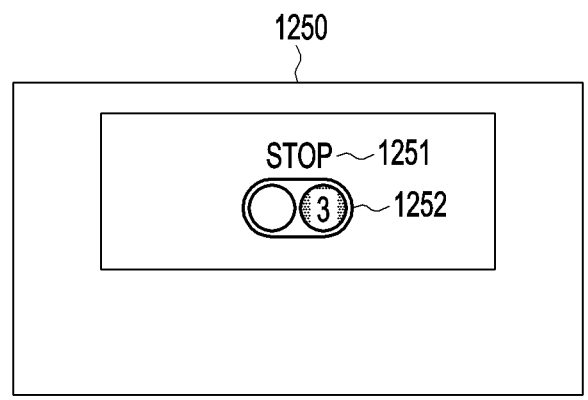
FIGS. 12B and 12C are diagrams illustrating an example virtual traffic light UI for displaying driving guide information according to an embodiment.
Figure 12C:
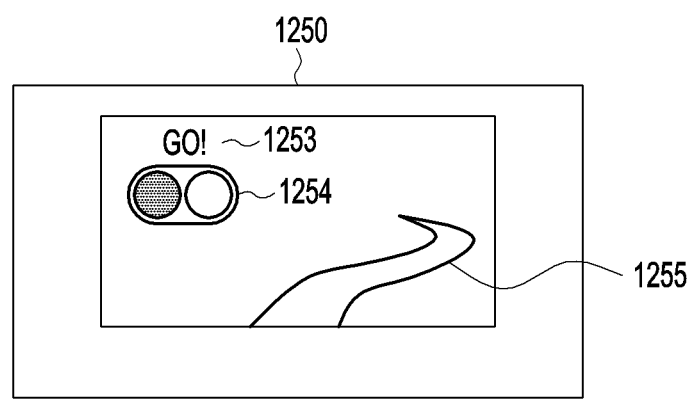

FIG. 12A is a flowchart illustrating an example method of displaying driving guide information according to an embodiment. FIGS. 12B and 12C are diagrams illustrating a virtual traffic light UI for displaying driving guide information according to an embodiment.

Referring to FIG. 12A, the electronic device 301 may receive driving guide information from the V2X server while the vehicle with the electronic device 301 is to enter the roundabout or has already entered the roundabout and is driving at the roundabout and may display the driving guide information. The electronic device 301 may correspond to at least one of a smartphone or tablet PC mounted in the vehicle, an HUD, a CID, a cluster, a window, or a display device capable of displaying information.

In operation 1210, the electronic device 301 may enter within a designated distance (predetermined range) from the roundabout while the vehicle drives towards the roundabout.

In operation 1220, the electronic device 301 may transmit the driving-related information to the V2X server corresponding to entry within the designated distance from the roundabout. The driving-related information may include at least one of the destination, driving lane, driving direction, current position, current speed, or steering angle of the electronic device (301)-equipped vehicle and may be transmitted to the V2X server when at least one condition of the entry/exit of the vehicle into/from the roundabout, lane change, or designated period is met.

In operation 1230, the electronic device 301 may receive driving guide information from the V2X server. The driving guide information may be information that the V2X server provides to lead each vehicle to a proper driving context based on the result of analyzing the traffic of the roundabout at a particular time using the driving-related information gathered from the vehicles positioned around the roundabout and may include at least one of the expected wait time for entry, lane guide, driving indication, or stop indication.

In operation 1240, the electronic device 301 may display the driving guide information received from the V2X server through the display provided in the electronic device 301. The display may correspond to at least one of an HUD, a CID, a cluster, a window, or a smartphone or tablet PC mounted in the vehicle which may display information in the vehicle. According to an embodiment, the electronic device 301 may display a virtual traffic light UI on the display 320 for delivering more intuitive information and display the driving guide information using the virtual traffic light UI. The virtual traffic light UI may be displayed as shown in FIG. 12B.

FIG. 12B illustrates an example of the virtual traffic light UI displaying driving guide information corresponding to a wait signal. When the driving guide information is a wait signal instructing the vehicle to wait for entry, the display 1250 of the electronic device 301 may display a stop text 1251 and a red traffic light 1252. The red traffic light may be displayed along with the expected wait time, and the expected wait time may be displayed to be counted over time.

FIG. 12C illustrates an example of the virtual traffic light UI displaying driving guide information corresponding to an entry signal. When the driving guide information is an entry signal instructing the vehicle to enter, the display 1250 of the electronic device 301 may display a driving text 1253 and a green traffic light 1254. When the entry signal is displayed on the display 1250, the driving lane guide 1255 may be displayed together. According to an embodiment, the driving guide information may be output using another output device (e.g., an audio module) provided in the electronic device 301 or the vehicle to be interoperable with the electronic device 301.

According to an embodiment, a method of displaying driving guide information may include, when a vehicle with an electronic device enters within a designated distance from a roundabout, transmitting driving-related information to a V2X service server and displaying driving guide information received from the V2X service server.

According to an embodiment, displaying the driving guide information may include displaying a virtual traffic light on a display and displaying at least one of an expected wait time, a lane guide, a driving indication, or a stop indication using the virtual traffic light.

FIGS. 13A, 13B, 13C, and 13D are diagrams illustrating an example scheme of providing a driving guide in each context where vehicles enter/exit a roundabout 1300 at different times from different directions according to an embodiment.

Figure 13A:
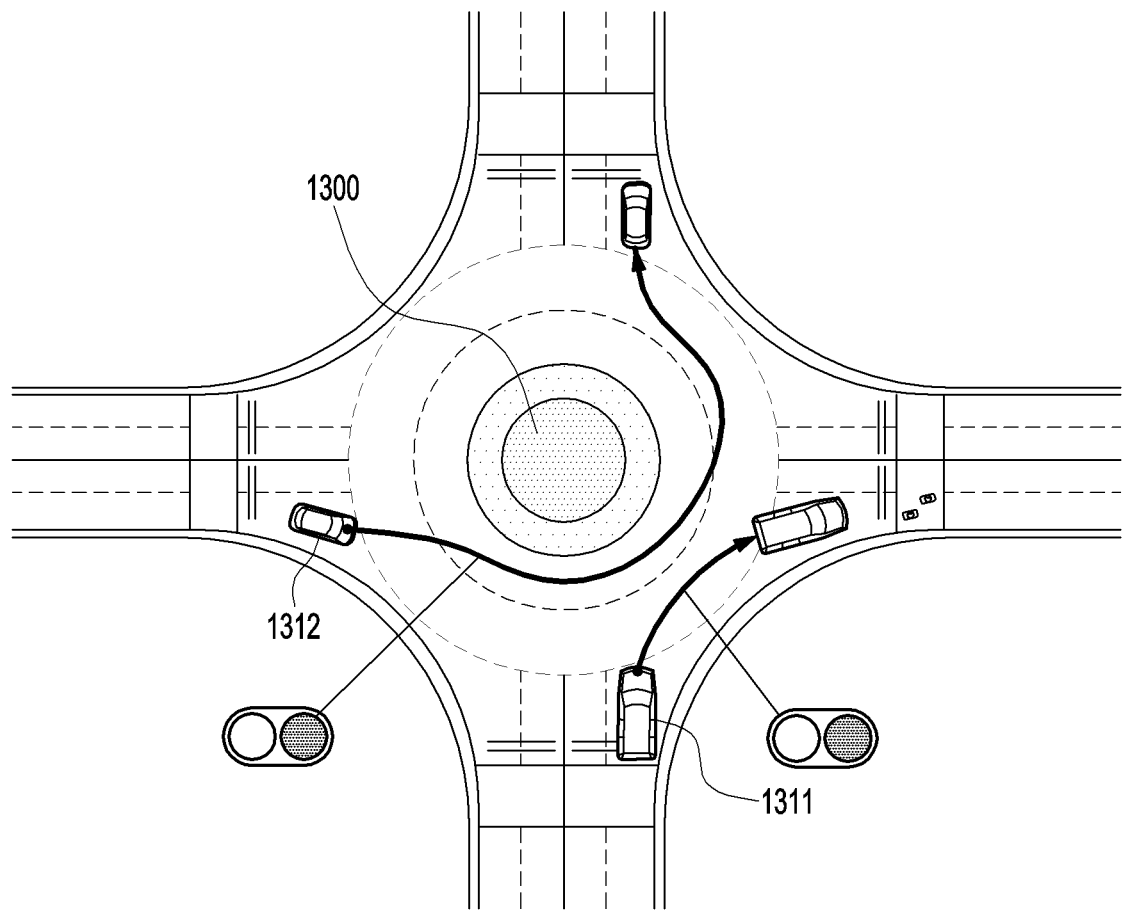
FIGS. 13A, 13B, 13C, and 13D are diagrams illustrating an example scheme of providing a driving guide in each context where vehicles enter/exit a roundabout at different times from different directions according to an embodiment.

FIG. 13A illustrates a context where a second vehicle 1312 enters first and turns into the roundabout 1300, then a first vehicle 1311 enters from the south of the roundabout 1300. The V2X server 100 may predict that the first vehicle 1311 will leave east on the outer lane of the roundabout 1300 and the second vehicle 1312 exits north on the inner lane of the roundabout 1300 based on the driving-related information about the first vehicle 1311 and the second vehicle 1312. Based on the prediction, the V2X server 100 may determine that the first vehicle 1311 and the second vehicle 1312 do not overlap in driving route and time while they use the roundabout and, according to the determination, provide driving guide information corresponding to the entry signal to the first vehicle 1311 and the second vehicle 1312. The entry signal may be displayed as a green traffic light on the display provided in the first vehicle 1311 and the second vehicle 1312.

Figure 13B:
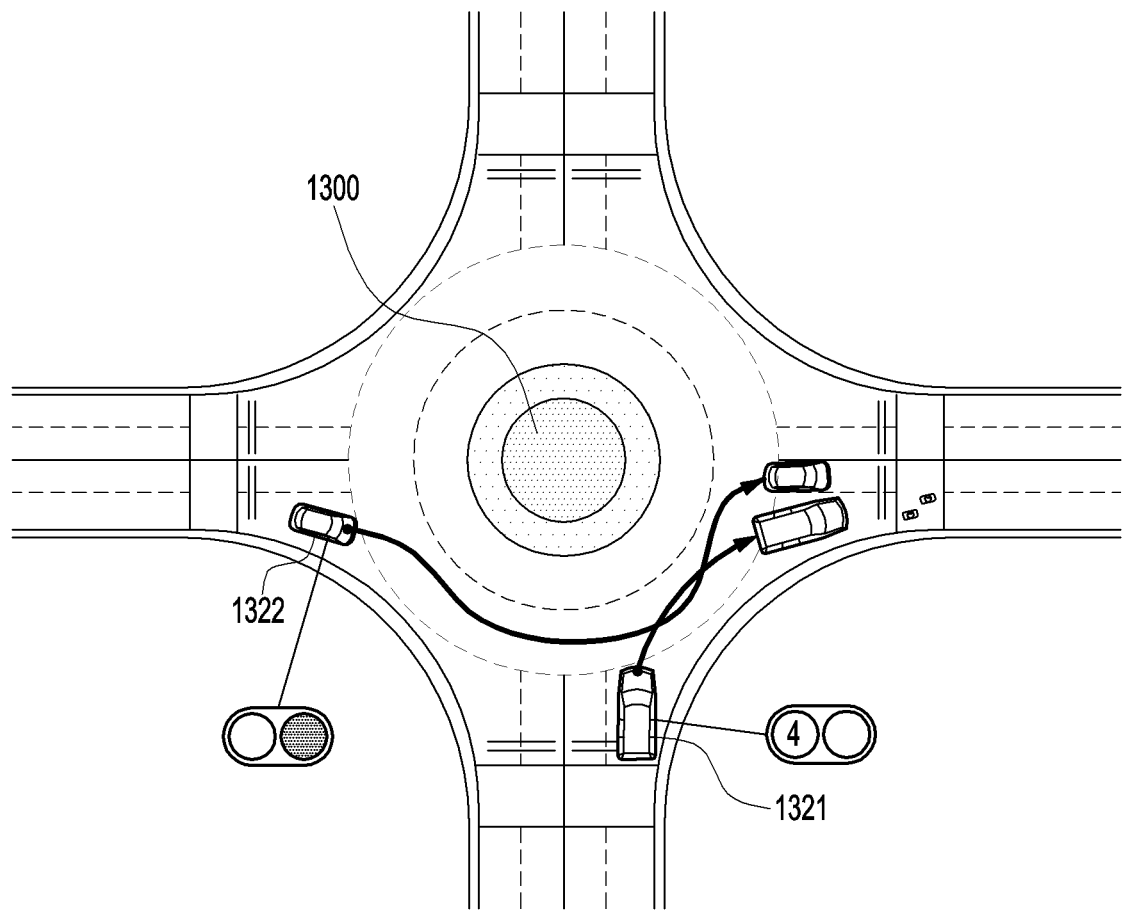

FIG. 13B illustrates a context where a second vehicle 1322 enters first and turns at the roundabout 1300 at the time when a first vehicle 1321 enters from the south of the roundabout 1300. The V2X server 100 may predict that the first vehicle 1321 and the second vehicle 1322 both will leave to the east on the outer lane of the roundabout 1300 based on the driving-related information about the first vehicle 1321 and the second vehicle 1322. Based on the prediction, the V2X server 100 may determine that the first vehicle 1321 and the second vehicle 1322 may overlap in driving route and time while they use the roundabout and, according to the determination, provide driving guide information to the first vehicle 1321 and the second vehicle 1322. During this course, the V2X server 100 may give a driving priority to the second vehicle 1322 and transmit the driving guide information corresponding to the entry signal. The V2X server 100 may predict that four seconds are required for the second vehicle 1322 to secure a safety distance from the first vehicle 1321 and, based on the prediction, transmit the driving guide information corresponding to the wait signal to the first vehicle 1321. The wait signal may be displayed, as a red traffic light, on the display provided in the first vehicle 1321, and the expected wait time, 4 seconds, along with the red traffic light may be displayed to be counted.

Figure 13C:
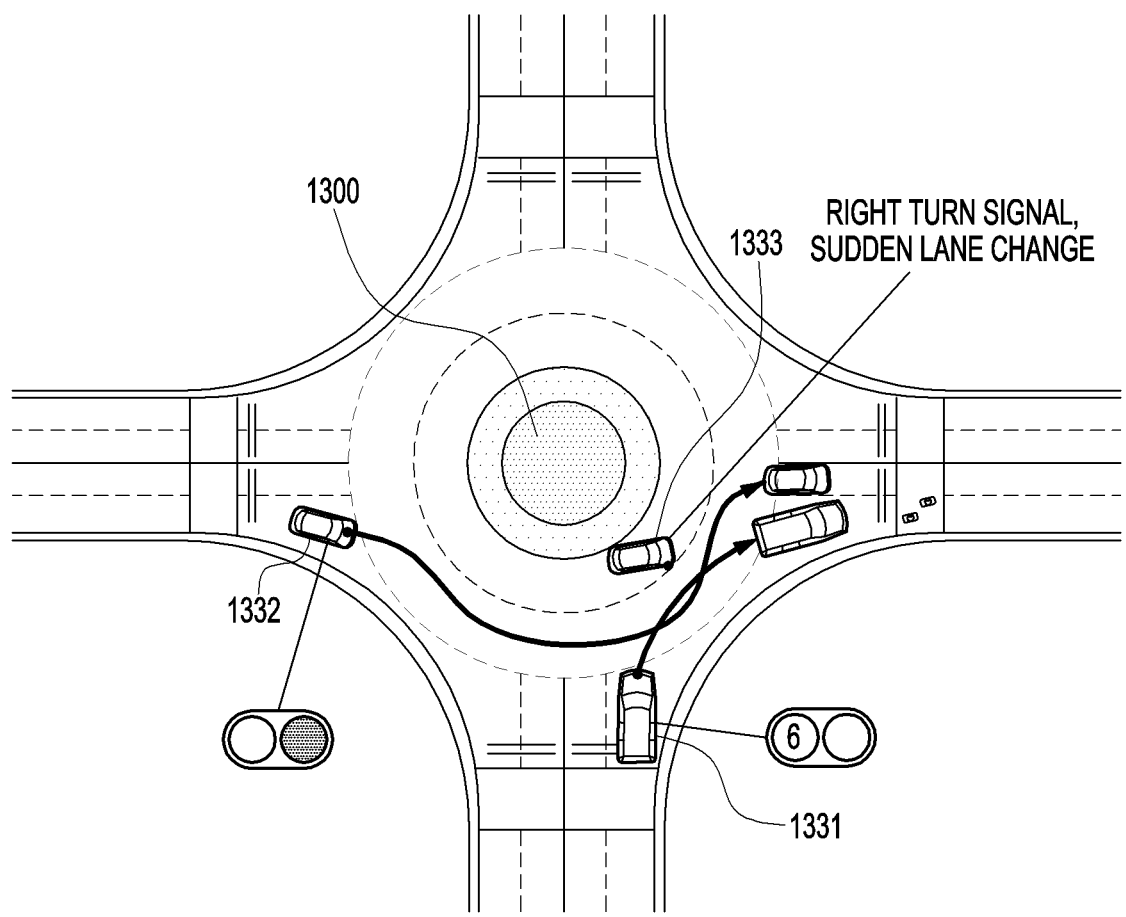

FIG. 13C illustrates a context where a second vehicle 1332 and a third vehicle 1333 enter first and turn at the roundabout 1300 at the time when a first vehicle 1331 enters from the south of the roundabout 1300. The V2X server 100 may predict that the first vehicle 1321 and the second vehicle 1322 will leave east on the outer lane of the roundabout 1300 based on the driving-related information about the vehicles. The V2X server 100 may predict that the third vehicle 1333 will change lanes and leave east corresponding to the turn-on of the right turn signal indicator of the third vehicle 1333 which is using the inner lane of the roundabout 1300. Based on the prediction, the V2X server 100 may determine that the first vehicle 1331, the second vehicle 1332, and the third vehicle 1333 may overlap in driving route and time and transmit the driving guide information about each vehicle according to the determination. During this course, the V2X server 100 may identify that four seconds are required for the second vehicle 1332 positioned behind of the second vehicle 1332 and the third vehicle 1333 which have entered earlier to secure a safety distance from the first vehicle 1331 and that a total of 6 seconds are required by reflecting the expected wait time, e.g., two seconds, by the lane change of the third vehicle 1333. Based on the determination and calculation, the V2X server 100 may transmit the driving guide information corresponding to the wait signal to the first vehicle 1331 and the second vehicle 1332. According to an embodiment, the wait signal for the first vehicle 1331 may be displayed on the display provided in the first vehicle 1331 to count the expected wait time, e.g., six seconds, along with a red traffic light. The wait signal for the second vehicle 1332 may be displayed on the display provided in the second vehicle 1332 to count the expected wait time, e.g., second seconds, along with a red traffic light.

Figure 13D:
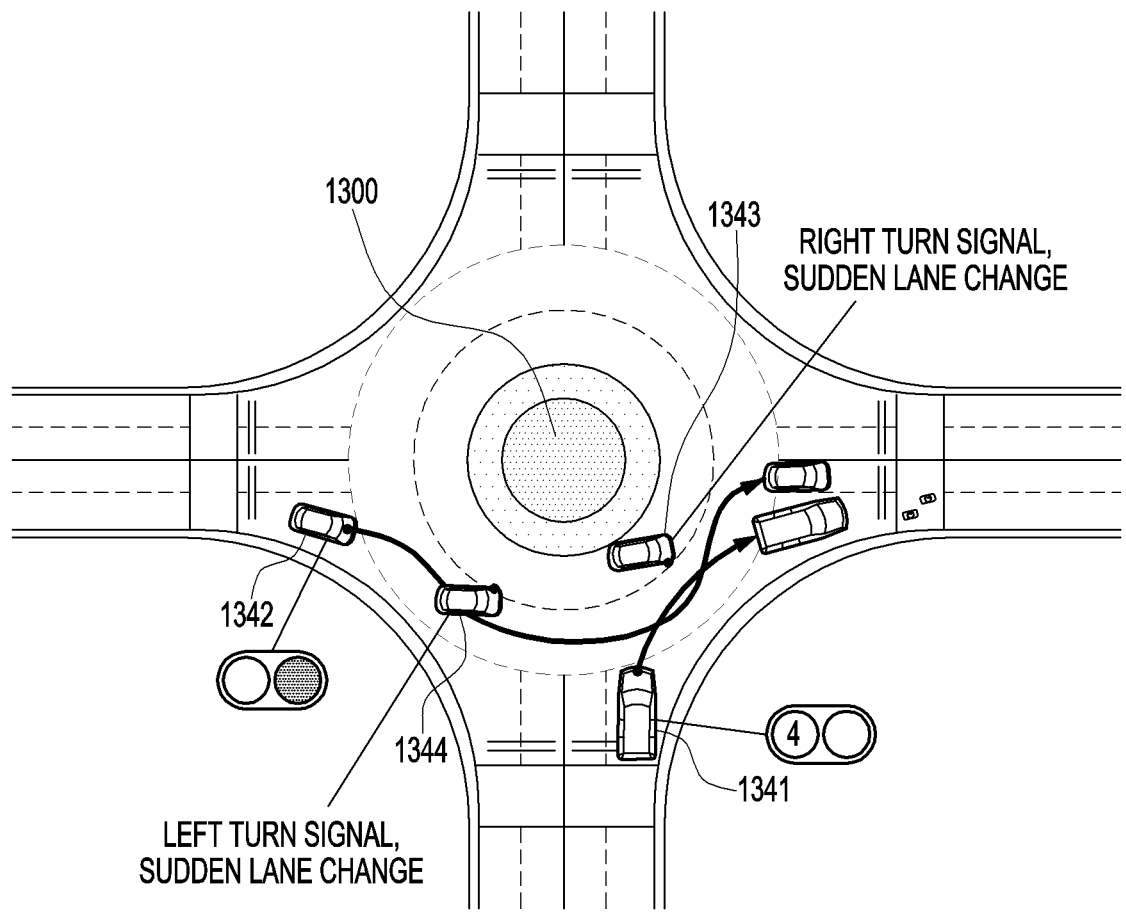

FIG. 13D illustrates a context where a second vehicle 1342, a third vehicle 1343, and a fourth vehicle 1344 enter first and turn at the roundabout 1300 at the time when a first vehicle 1341 enters from the south side of the roundabout 1300. The V2X server 100 may predict that the first vehicle 1341 and the second vehicle 1342 will leave east on the outer lane of the roundabout 1300 based on the driving-related information about the vehicles. The V2X server 100 may predict that the third vehicle 1343 will change lanes and leave east corresponding to the turn-on of the right turn signal indicator of the third vehicle 1343 which is using the inner lane of the roundabout 1300 and that the fourth vehicle 1344 will change lanes corresponding to the turn-on of the left turn signal indicator of the fourth vehicle 1344 driving on the outer lane of the roundabout 1300. Based on the prediction, the V2X server 100 may determine that the first vehicle 1341, the second vehicle 1342, and the third vehicle 1343 may overlap in driving route and time and transmit the driving guide information about each vehicle according to the determination. During this course, the V2X server 100 may determine that four seconds are required for the rearmost one, e.g., the second vehicle 1342 among the pre-entering vehicles, e.g., the second vehicle 1342, the third vehicle 1343, and the fourth vehicle 1344 to secure a safety distance from the first vehicle 1331. Thereafter, the V2X server 100 may determine that the interval occupancy time of the second vehicle 1342 is reduced by two seconds as the fourth vehicle 1344 changes lanes and the interval occupancy time of the second vehicle 1342 is increased by two seconds as the third vehicle 1343 changes lanes and determine that a total of four seconds are required to secure a safety distance from the first vehicle 1341 by reflecting the result of determination. Based on the determination and calculation, the V2X server 100 may transmit the driving guide information corresponding to the wait signal to the first vehicle 1341 and the driving guide information corresponding to the entry signal to the second vehicle 1342. According to an embodiment, the wait signal for the first vehicle 1341 may be displayed on the display provided in the first vehicle 1341 to count the expected wait time, e.g., four seconds, along with a red traffic light. The entry signal for the second vehicle 1342 may be displayed as a green traffic light on the display provided in the second vehicle 1342.

Figure 14:
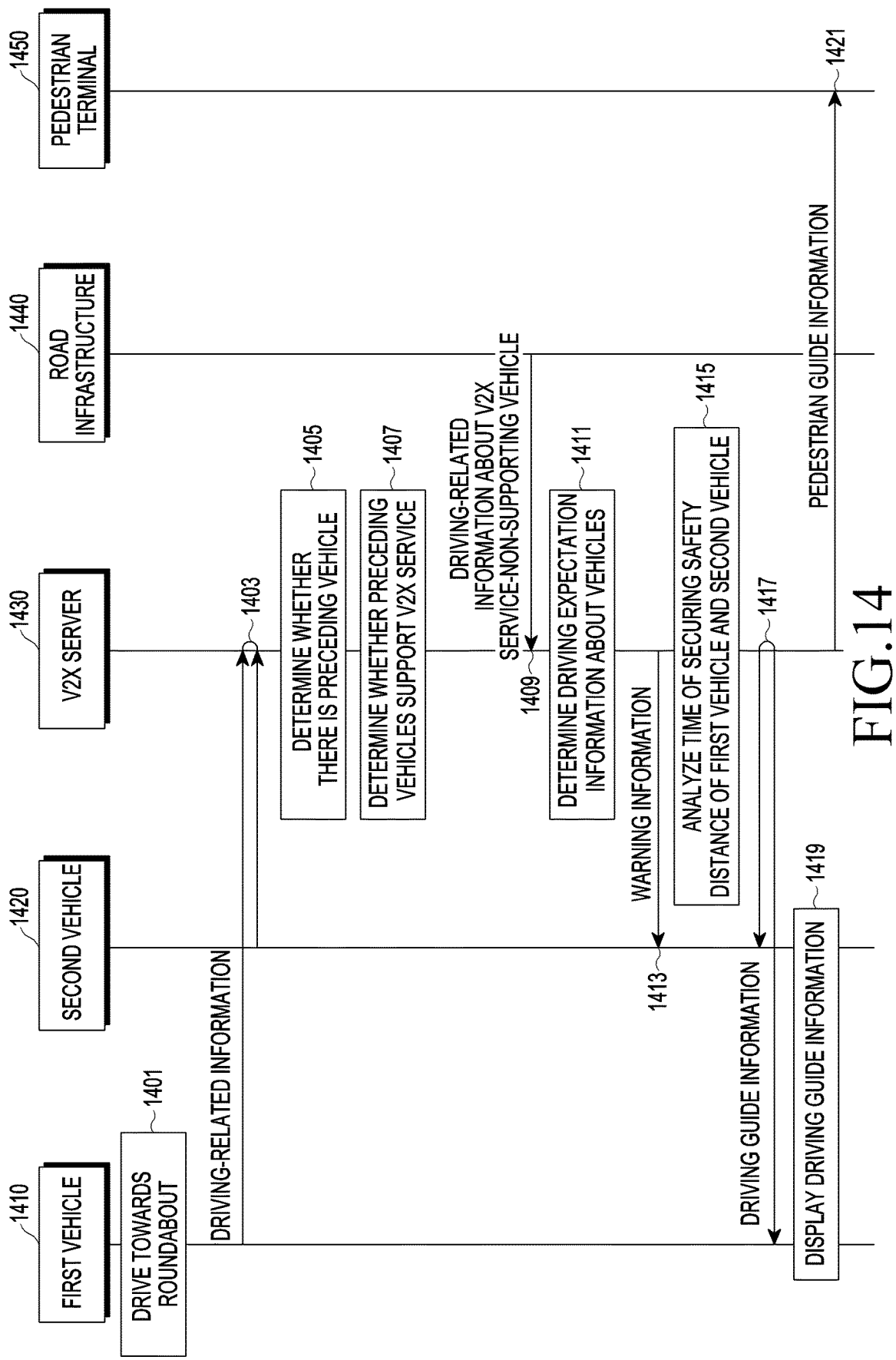
FIG. 14 is a sequence diagram illustrating an example process of providing per-vehicle driving guide information to vehicles which are using, or are to use, a roundabout according to an embodiment.

FIG. 14 is a sequence diagram illustrating an example process of providing per-vehicle driving guide information to vehicles which are using, or are to use, a roundabout according to an embodiment. Referring to FIG. 14, a first vehicle 1410, a second vehicle 1420, a V2X server 1430, a road infrastructure 1440, and a pedestrian terminal 1450 may communicate using V2X technology.

Referring to FIG. 14, in operation 1401, the first vehicle 1410 may drive towards a roundabout.

In operation 1403, the V2X server 1430 may receive driving-related information from at least one second vehicle 1420 positioned within a designated range from the roundabout as well as from the first vehicle 1410 approaching the roundabout. The driving-related information may include at least one of the destination, driving lane, driving direction, current position, current speed, or steering angle for each vehicle. The V2X server 1430 may obtain the driving-related information corresponding to at least one condition of an occurrence of a vehicle entering or exiting the roundabout, a lane change of at least one of the plurality of vehicles, or a designated period.

In operation 1405, the V2X server 1430 may determine whether there is a vehicle preceding the time of arrival of the first vehicle 1410 to analyze the traffic of the time when the first vehicle 1410 arrives at the roundabout.

When there are determined in operation 1405 to be preceding vehicles, the V2X server 1430 may further determine whether the preceding vehicles support the V2X service in operation 1407. Upon determining, in operation 1407, that a V2X service-non-supporting vehicle is among the preceding vehicles, the V2X server 1430 may obtain driving-related information about the V2X service-non-supporting vehicle from the road infrastructure 1440 installed in the roundabout in operation 1409. The driving-related information about the V2X service-non-supporting vehicle may include at least one of the current position, current speed, steering angle, or whether the turn signal indicator is on for the vehicle.

In operation 1411, the V2X server 1430 may determine driving expectation information per vehicle based on the driving-related information about the preceding vehicles. The driving expectation information may refer, for example, to the driving direction and time of each of the preceding vehicles expected to use the roundabout at the time when the first vehicle 1410 arrives at the roundabout. Based on the determined per-vehicle driving expectation information, the V2X server 1430 may, in operation 1413, transmit warning information to the second vehicle 1420 expected to overlap the first vehicle 1410 in driving route and time.

In operation 1415, the V2X server 1430 may analyze the time when the first vehicle 1410 secures a safety distance from the second vehicle 1420. In operation 1417, the V2X server 1430 may transmit the driving guide information corresponding to the wait signal or entry signal to the first vehicle 1410 and the second vehicle 1420 based on the analysis.

Unless there is determined in operation 1405 to be a preceding vehicle, the V2X server 1430 may skip operations 1407 to 1415 and may immediately perform operation 1417 to transmit driving guide information to each vehicle.

Receiving the driving guide information from the V2X server 1430, the first vehicle 1410 or the second vehicle 1420 may display the driving guide information through the display provided in each vehicle in operation 1419. For example, each vehicle may display the driving guide information using the virtual traffic light UI. When the driving guide information corresponds to the wait signal, the expected wait time and a brief notification indicating 'stop,' along with the red traffic light, may be displayed. When the driving guide information corresponds to the entry signal, the driving lane guide and a brief notification indicating 'enter,' along with the green traffic light, may be displayed. The driving guide information may be output through another output device (e.g., a speaker) provided in each vehicle.

According to an embodiment, in operation 1421, the V2X server 1430 may produce pedestrian guide information based on the result of analysis (e.g., operation 1415) and transmit the produced pedestrian guide to the pedestrian terminal 1450 positioned within a designated distance from the point where the vehicle leaving the roundabout is expected to exit.

Figure 15:
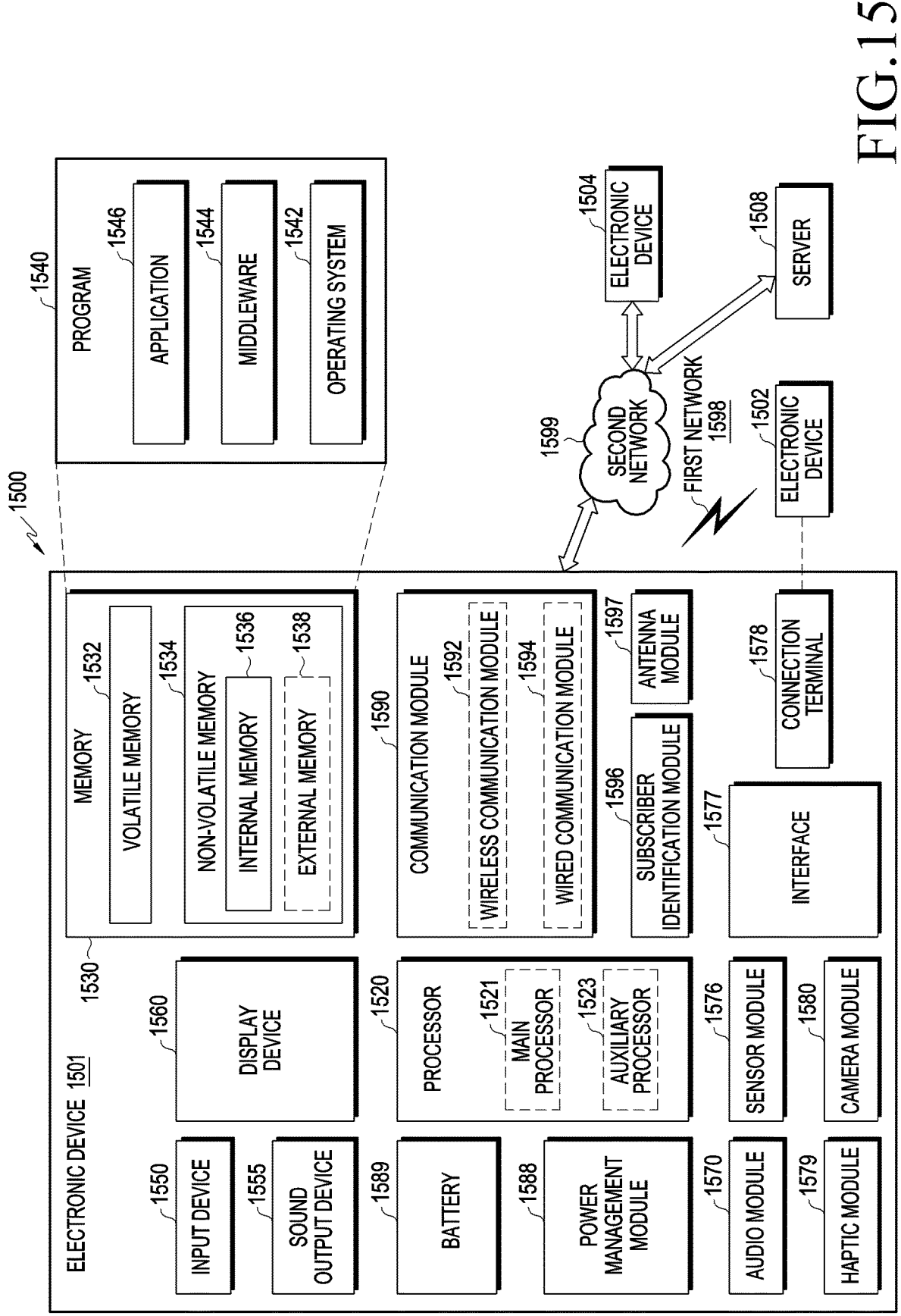
FIG. 15 is a block diagram illustrating an example electronic device in a network environment according to an embodiment.

FIG. 15 is a block diagram illustrating an example electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network) or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 101. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520 and may perform various data processing or computation. According to an example embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 1523 may be adapted to consume less power than the main processor 1521 or to be specific to a specified function. The auxiliary processor 1523 may be implemented as separate from or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 123.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501 from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 170 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1801, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or motion) or electrical stimulus which may be recognized by a user via his or her tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an example embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip) or may be implemented as multi components (e.g., multi chips) separate from each other. The wireless communication module 192 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 1597 may include a plurality of antennas. In this case, at least one antenna appropriate for a communication scheme used in a communication network, such as the first network 1598 or the second network 1599, may be selected from the plurality of antennas by, e.g., the communication module 1590. The signal or the power may then be transmitted or received between the communication module 1590 and the external electronic device via the selected at least one antenna. According to an embodiment, other parts (e.g., radio frequency integrated circuit (RFIC)) than the radiator may be further formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 101). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there may be provided a storage medium storing instructions which, when executed by at least one processor 1520, enable the at least one processor to control the electronic device to perform at least one operation which, in a method of providing driving guide information at a roundabout, comprises obtaining driving-related information from each of a plurality of vehicles positioned within a designated distance from the roundabout, determining driving expectation information about a time and direction in which each of the plurality of vehicles enters or exits the roundabout based on the obtained driving-related information, and transmitting driving guide information produced based on the determined driving expectation information to each of the plurality of vehicles.

As is apparent from the foregoing description, according to various embodiments, the electronic device and method may gather and analyze information in advance regarding the driving context of vehicles which are to enter a roundabout, determine the order of driving of the vehicles before entering the roundabout, and provide a driving guide to each vehicle, thereby preventing and/or reducing traffic accidents and promoting smooth flow of traffic at the roundabout.

According to various embodiments, the electronic device and method may precisely or more accurately predict traffic and provide a driving guide per vehicle regardless of whether vehicles using a roundabout are capable of V2X communication, thereby leading to more driving safety and convenience.

According to various embodiments, the electronic device and method may provide a driving guide per vehicle by way of an intuitive output equipped in the vehicle, thereby providing various experiences to the driver.

The various example embodiments disclosed herein are provided for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
   a communication module comprising communication circuitry;
   a processor; and
   a memory operatively connected with the communication module and the processor,
   wherein the memory stores instructions which, when executed, enable the processor to:
   obtain driving-related information from each of a plurality of vehicles positioned within a designated distance from a roundabout via the communication module;
   determine driving expectation information about a time and direction in which each of the plurality of vehicles enters or exits the roundabout based on the obtained driving-related information;
   determine a driving priority based on a wait time, a driving direction, and a priority of entry for each of the plurality of vehicles; and
   transmit driving guide information based on the driving expectation information and the driving priority to each of the plurality of vehicles via the communication module.

2. The electronic device of claim 1, wherein the instructions enable the processor to: determine a time at which a first vehicle entering the roundabout in a first direction among the plurality of vehicles secures a safety distance from at least one second vehicle having previously entered the roundabout and determine the driving guide information including at least one of an expected wait time, lane guide, driving indication, or stop indication of each vehicle based on a result of the determination.

3. The electronic device of claim 2, wherein the instructions enable the processor to update and transmit the driving guide information based on the at least one second vehicle changing lanes.

4. The electronic device of claim 1, wherein the instructions enable the processor to determine whether each of the plurality of vehicles supports a vehicle-to-everything (V2X) service and obtain the driving-related information including at least one of a destination, a driving lane, a driving direction, a current position, a current speed, or a steering angle based on the vehicle supporting the V2X service.

5. The electronic device of claim 4, wherein the instructions enable the processor to obtain the driving-related information including at least one of the current position, the current speed, the steering angle, whether a turn signal indicator is on, or a record about a driving habit based on the vehicle not supporting the V2X service.

6. The electronic device of claim 1, wherein the instructions enable the processor to calculate an expected occupancy time per interval of the roundabout for each of the plurality of vehicles based on at least one of the driving-related information or the driving expectation information and determine the driving guide information for the plurality of vehicles using the calculated per-interval expected occupancy time.

7. The electronic device of claim 1, wherein the instructions are configured to enable the processor to obtain the driving-related information corresponding to at least one condition of an occurrence of a vehicle entering or exiting the roundabout, a lane change of at least one of the plurality of vehicles, or a designated period and update the determination of the driving expectation information based on the driving-related information obtained corresponding to the at least one condition.

8. The electronic device of claim 1, wherein the instructions are configured to enable the processor to determine a direction of exiting the roundabout for the plurality of vehicles and transmit pedestrian guide information to a pedestrian terminal positioned within the designated distance from the roundabout based on the determination.

9. A method of providing driving guide information at a roundabout, the method comprising:
   obtaining driving-related information from each of a plurality of vehicles positioned within a designated distance from the roundabout;
   determining driving expectation information about a time and direction in which each of the plurality of vehicles enters or exits the roundabout based on the obtained driving-related information;
   determining a driving priority based on a wait time, a driving direction, and a priority of entry for each of the plurality of vehicles; and
   transmitting driving guide information based on the driving expectation information and the driving priority to each of the plurality of vehicles.

10. The method of claim 9, wherein determining the driving expectation information includes determining a time when a first vehicle entering the roundabout in a first direction among the plurality of vehicles secures a safety distance from at least one second vehicle having previously entered the roundabout and determining the driving guide information including at least one of an expected wait time, lane guide, driving indication, or stop indication of each vehicle based on a result of the determination.

11. The method of claim 10, wherein determining the driving expectation information includes updating the driving guide information based on the at least one second vehicle changing lanes.

12. The method of claim 9, wherein obtaining the driving-related information includes determining whether each of the plurality of vehicles supports a vehicle-to-everything (V2X) service and obtaining the driving-related information including at least one of a destination, a driving lane, a driving direction, a current position, a current speed, or a steering angle based on the vehicle supporting the V2X service.

13. The method of claim 12, wherein obtaining the driving-related information includes obtaining the driving-related information including at least one of the current position, the current speed, the steering angle, whether a turn signal indicator is on, or a record about a driving habit based on the vehicle not supporting the V2X service.

14. The method of claim 9, wherein transmitting the driving guide information includes calculating an expected occupancy time per interval of the roundabout for each of the plurality of vehicles based on at least one of the driving-related information or the driving expectation information and determining the driving guide information for the plurality of vehicles using the calculated per-interval expected occupancy time.

15. The method of claim 9, wherein the driving-related information is obtained corresponding to at least one condition of an occurrence of a vehicle entering or exiting the roundabout, a lane change of at least one of the plurality of vehicles, or a designated period, and wherein the driving expectation information is updated based on the driving-related information obtained corresponding to the at least one condition.

16. The method of claim 9, further comprising:
determining a direction of exiting the roundabout for the plurality of vehicles; and
transmitting pedestrian guide information to a pedestrian terminal positioned within the designated distance from the roundabout based on the determination.

17. An electronic device, comprising:
a communication module comprising communication circuitry;
a display;
a processor; and
a memory operatively connected with the processor, wherein the memory stores instructions which, when executed, enable the processor to:
transmit driving-related information to a V2X service server via the communication module based on a vehicle having the electronic device installed therein entering a designated distance from a roundabout; and
receive, from the V2X service server, driving guide information including an expected wait time to enter the roundabout; and
display the expected wait time to enter the roundabout on the display.

18. The electronic device of claim 17, wherein the instructions enable the processor to display a virtual traffic light on the display and display at least one of lane guide, driving indication, or stop indication using the virtual traffic light.

* * * * *